US012745127B2

(12) United States Patent
Doostnejad et al.

(10) Patent No.: US 12,745,127 B2
(45) Date of Patent: Sep. 22, 2026

(54) QUALITY OF SERVICE MANAGEMENT FOR 5G NETWORKS

(71) Applicant: Intel Corporation, Santa Clara, CA (US)

(72) Inventors: Roya Doostnejad, Los Altos, CA (US); John Joseph Browne, Limerick (IE); Francesc Guim Bernat, Barcelona (ES); Valerie J. Parker, Portland, OR (US); Christopher MacNamara, Limerick (IE); Akhilesh S. Thyagaturu, Ruskin, FL (US); Soo Jin Tan, Shanghai (CN); Xiangyang Zhuang, Santa Clara, CA (US); John Belstner, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/371,917

(22) Filed: Sep. 22, 2023

(65) Prior Publication Data

US 2024/0015569 A1 Jan. 11, 2024

Related U.S. Application Data

(60) Provisional application No. 63/434,335, filed on Dec. 21, 2022.

(30) Foreign Application Priority Data

Aug. 18, 2023 (WO) ................ PCT/CN2023/113737

(51) Int. Cl.
*H04W 28/02* (2009.01)
*H04W 24/04* (2009.01)
*H04W 28/24* (2009.01)

(52) U.S. Cl.
CPC ....... *H04W 28/0268* (2013.01); *H04W 24/04* (2013.01); *H04W 28/24* (2013.01)

(58) Field of Classification Search
CPC . H04W 28/0268; H04W 24/04; H04W 28/24; H04W 88/06; H04L 47/24
See application file for complete search history.

(56) References Cited

U.S. PATENT DOCUMENTS

| | | | | |
|---|---|---|---|---|
| 2019/0394279 | A1* | 12/2019 | Dao | H04W 48/04 |
| 2024/0098018 | A1* | 3/2024 | Li | H04L 45/302 |
| 2024/0121657 | A1* | 4/2024 | Zhang | H04W 12/037 |

OTHER PUBLICATIONS

Lemes, Mario Teixeira, "A Tutorial on Trusted and Untrusted Non 3GPP Accesses in 5G Systems First Steps Toward a Unified Communications Infrastructure", IEEE Access, (Nov. 4, 2022), 24 pgs.

(Continued)

*Primary Examiner* — Kiet Tang
(74) *Attorney, Agent, or Firm* — Schwegman Lundberg & Woessner, P.A.

(57) ABSTRACT

Various systems and methods for implementing end-to-end quality of service (QoS) for network communications are provided using various network and compute technologies. In an example, managing Quality of Service (QoS) for end-to-end network data flows, includes: identifying QoS characteristics for data flows of a user equipment (UE), for data flows performed via multiple access networks; mapping the QoS characteristics to network functions of at least one of the multiple access networks; and controlling the network functions of the at least one of the multiple access networks, based on the QoS characteristics, as the network functions are implemented at respective resources located within at least one of the multiple access networks. Further examples for controlling the network functions using Access Traffic Steering, Switching and Splitting (ATSSS) functionality in (Continued)

an 3GPP multi-access network, and configuring a network exposure function of an 3GPP multi-access network, are also disclosed.

21 Claims, 19 Drawing Sheets

(56) References Cited

OTHER PUBLICATIONS

Vasudevan, Anil, “Interconnect Day”, Intel, (Apr. 8, 2019), 23 pgs.

* cited by examiner

QUALITY OF SERVICE MANAGEMENT FOR 5G NETWORKS

PRIORITY CLAIM

This application claims the benefit of priority to Chinese PCT Application Serial Number PCT/CN2023/113737, filed Aug. 18, 2023, which is incorporated herein by reference in its entirety.

This application claims the benefit of priority to United States Provisional Patent Application No. 63/434,335, filed Dec. 21, 2022, and titled "TECHNOLOGIES FOR ENABLING END-TO-END QUALITY OF SERVICE IN ENTERPRISE FIFTH GENERATION CONVERGED MULTI-ACCESS SYSTEMS", which is incorporated herein by reference in its entirety.

BACKGROUND

3GPP standards bodies have finalized details of a data steering approach for a multi-access networking architecture called, Access Traffic Steering, Switching and Splitting (ATSSS). ATSSS uses multiple tunnels for data communication, and is designed to support several modes including active standby, smallest delay, load balancing, redundant traffic steering and priority based. Other efforts have been developed in addition to 3GPP ATSSS. For example, Generic Multi Access (GMA) is an Internet Engineering Task Force (IETF) effort to support steering, splitting and duplication of data across any two networks. However, ATSSS, GMA, and similar efforts do not include complete mechanisms to ensure end-to-end quality of service (QoS).

Additionally, with the rapid growth in containerization technology adoption, such as Dockers/Kubernetes and cloud computing, it is a clear trend that multi-tenancy is on the increase. A system may have several virtual machines, and several containers running within a respective virtual machine. These "tenants" may be communicating over the network and may be sharing network resources, which in a given server, may involve multiple network controllers. This is complicated by the movement of services closer to user equipment (UEs) and devices where resources (compute, network, etc.) are typically scarce. If resources are not properly sized depending on the given demand for a given service, QoS cannot be properly planned or achieved.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
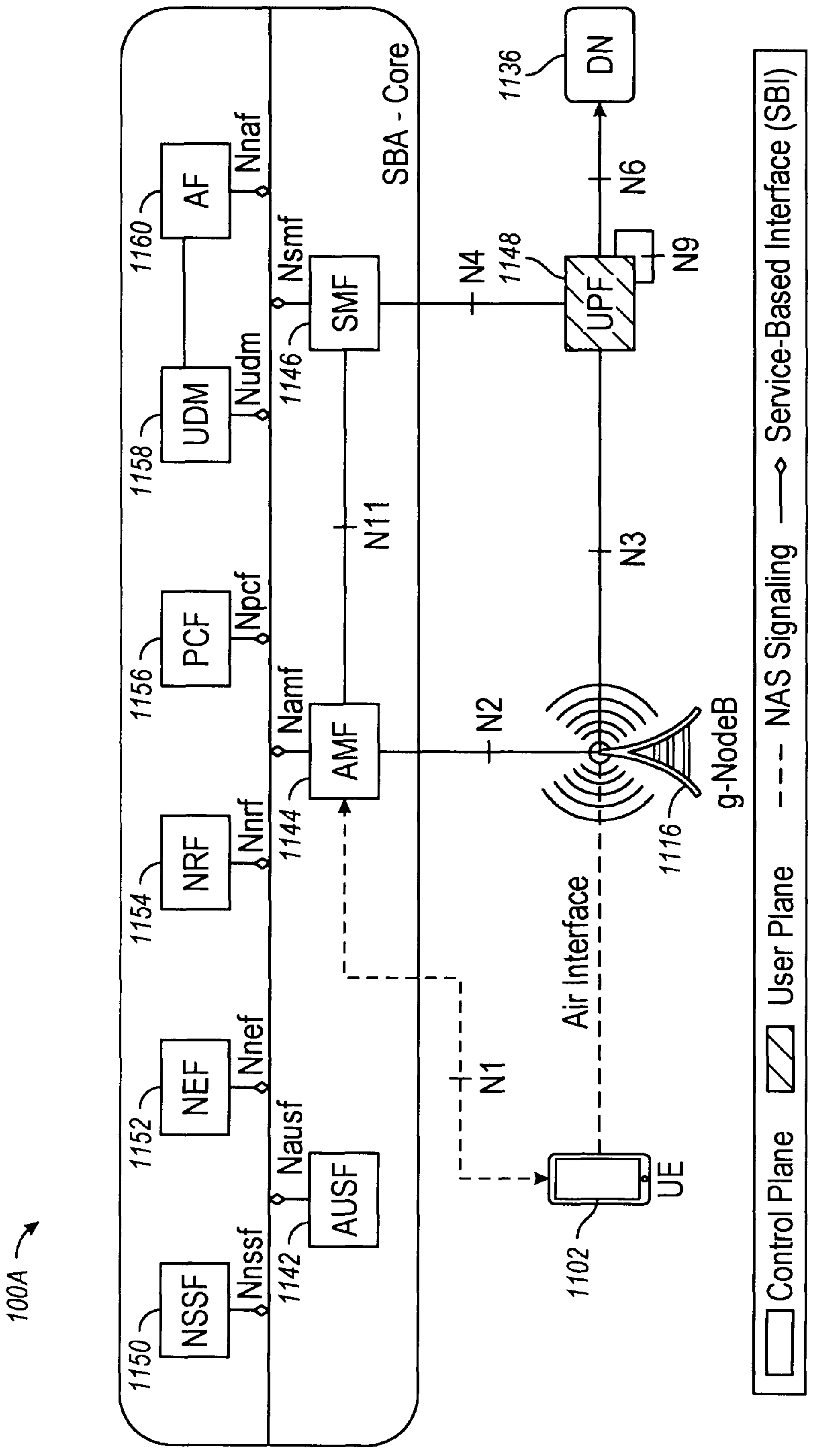
FIG. 1A depicts an example 5G service-based architecture, according to an example.

In the following description, methods, configurations, and related apparatuses are disclosed for implementations of end-to-end QoS via network and compute technologies. In this context, a variety of improvements are provided which relate to edge computing, cloud computing, network communication, data centers, network topologies, communication system implementations, Multiple Access Management Services (MAMS), and Fifth Generation (5G) Access Traffic Switching, Steering, and Splitting (ATSSS), and in particular, to technologies and techniques for enabling End-To-End (E2E) Quality of Service (QoS) in enterprise Fifth Generation (5G) converged multi-access networks.

A first aspect discussed herein relates to converged multi-access networking. In 3GPP access networks, converged multi-access connectivity is defined by including architectures to integrate WLAN network access through the 5G core network (5GC). In addition, 3GPP defines approaches for routing data across licensed and unlicensed networks. However, there is no mechanism to guarantee E2E QoS, and there is no mechanism for seamless dynamic traffic routing across two networks. In particular, existing solutions do not maintain QoS when data is transferred from 3GPP access networks (e.g., 5G) to non-3GPP access networks (referred to as "N3ANs", e.g., WLAN access). As noted, 3GPP 5G standards have begun to define ATSSS to enable multiple tunnels for data communication. ATSSS supports four steering modes: active standby, smallest delay, load balancing and priority based. In ATSSS, the steering modes are decided by the network and performed by the user equipment (UE) and User Plane Function (UPF) based on E2E measurements. However, in ATSSS, the UE and UPF cannot distribute the traffic according to the link performance in real time. In particular, the ATSSS steering modes do not allow for adjustment of the traffic dynamically based on the link status. Additionally, separate from 3GPP, the Generic Multi Access (GMA) protocol has been developed, which supports steering, splitting, and duplication of data across two networks. However, GMA does not follow 5G QoS standards and steers traffic based on one way delay and power measurements.

A second aspect discussed herein relates to adaptive QoS management in networks and hardware devices, to provide consistent 5G E2E QoS for respective data flows across multiple devices and device types. Among other examples, this can be provided by matching network device resources and compute resources to the required SLA for the end-to-end services based on coordinated network interface controller (NIC) Application Device Queues (ADQ) reconfigurations. This architecture replaces a static 5G-unaware configuration of the NIC with a new NIC capability that allows mapping of services into a 5G packet flow. This architecture also enables an adaptive QoS shaping at the NICs in coordination with both the application QoS requirements and the actual bandwidth observed and predicted at 5G for the respective services.

The present disclosure thus discusses multiple solutions to address E2E QoS, as well as mechanisms for traffic distribution over the multiple access networks considering channel conditions, link quality, and/or other network parameters/measurements. The examples discussed herein are not limited to 5G multi-access architectures, but are also applicable to other network access environments and settings.

Overview of Converged Multi-access Connectivity

In various implementations, a set of policies, QoS, priorities, and rules is established for a multi-access network, to assist the UE and the UPF for routing the data. A module, engine, or other network function (NF) based on QoS is integrated with the multi-tunnel mechanism (e.g., ATSSS and/or the like). Additionally or alternatively, RAN-based measurements are used to proactively adjust traffic distribution across accesses following QoS thresholds and policies. The engine/network function (NF) for optimizing traffic distribution can be either model-based or AI/ML-based. Additionally or alternatively, the traffic is sent over different access networks with an indication of QoS characteristics and priority, and/or N3ANs (e.g., WLAN and/or Wi-Fi) employ a subset of QoS mapping as 3GPP access networks (e.g., 5G).

The various implementations provide seamless dynamic traffic routing across 5G and Wi-Fi based on real time performance and faster detection of radio link degradation compared to default E2E measurements; direct mapping of QoS between 3GPP and N3ANs; and data routing and splitting based on the policy and traffic QoS instead of static roles. In an example, the following implementations are embodied as a QoS engine/NF implemented and integrated with ATSSS in the UPF. Additionally or alternatively, the following implementations can be specified by relevant standards, specification, technical references, and other documentation discussing converged wireless, seamless traffic routing between Wi-Fi and 5G, and QoS mapping.

The convergence of 5G systems (5GS) (e.g., 3GPP access networks 1310A, depicted in FIG. 13 and discussed below) and non-3GPP access networks (e.g., non-3GPP access networks 1310B, depicted in FIG. 13 and discussed below) may have an impact in the Information and Communication Technology (ICT) context. The 5G Core Network (5GCN) is highly flexible due to the adoption of Service-Based Architecture (SBA), network slicing, Software-Defined Networking (SDN), among other modern paradigms. In addition to the Next-Generation Radio Access Network (NG-RAN) based on 5G New Radio (5G-NR), the 5GCN was designed for integrating multiple access networks, such as Long Term Evolution (LTE)/4G and Wireless Local Area Network (WLAN) networks, simply and efficiently.

Integration between 3GPP access networks (3ANs) 1310A and non-3GPP access networks (N3ANs) 1310B, with effective solutions to relieve data congestion, address capacity, and coverage issues, is important to address the new use cases resulting from the explosive growth of Internet of Things (IoT) devices and industrial communication. This integration enables end-devices access through N3ANs 1310B and other networks with no 5G capabilities. This can enable legacy and IoT devices to benefit from the following 5G scenarios: (i) Enhanced Mobile Broadband (eMBB) for greater bandwidth, (ii) Massive Machine Type Communications (mMTC) for high connection density, and (iii) Ultra-Reliable Low Latency Communications (URLLC) for end-to-end latency reduction. The seamless interworking between 5G access and other industry access technologies minimizes operational costs to widespread adoption of 5G networks, especially in the initial phases.

Historically, there has been a desire to unify heterogeneous access networks to mobile cellular technologies. The integration between N3ANs 1310B and 3ANs 1310A can enable peak data rates, improve area capacity, lower delay, and provide localization enhancements. With the addition of trusted N3AN and wireline access support, the same 5GCN may provide services to a wide range of wireless and wireline access technologies, enabling integration and convergence between new and legacy networks. Additionally, access network convergence can facilitate Mobile Network Operators' (MNOs) management tasks by providing a single-core network. As a result, the integration of heterogeneous access networks can be beneficial for developing new applications, such as IoT and Industry 4.0.

FIG. 1A depicts an example 5GS SBA reference architecture 100A. The 5GS includes Radio Access Network (RAN) and an SBA—Core Network (CN). The respective elements of this architecture 100A are discussed in more detail below, with reference to FIG. 11.

The introduction of SBA in 5GCN is a significant change in comparison with 4G/Evolved Packet Core (EPC) and the previous generations of mobile communications. In the 5GCN, the core can be visualized and described differently. From one point of view, 5GCN is a collection of NFs that provides the expected core functionalities. An individual NF exposes its services to other NFs, acting as a service producer. As consumers, an NF can use the services offered by other NFs. Such ability exposes and makes services available, characterizing the so-called Service-Based Interface (SBI). From another point of view, 5GCN has several point-to-point communications, known as reference points. This representation describes how NFs interact with each other.

A producer-consumer model is a framework that defines the interaction among NFs. The services offered by an NF in 5GCN can be selected, for instance, by UE for core access and mobility management. Any UE needs to establish transport sessions for data transfer and maintain continuous communication with 5GCN for several control and management tasks. In accordance with this objective, an NAS protocol can be adopted to control message exchanging between UE and 5GCN.

FIG. 1A additionally illustrates how, in a 5GS service-based architecture (SBA) configuration, an SBA delivers services as a collection of NFs using the Control and User Plane Separation (CUPS) concept. The following NFs are shown in FIG. 1A: (i) Access and Mobility Function (AMF) 1144, (ii) Session Management Function (SMF) 1146, (iii) User Plane Function (UPF) 1148, (iv) Authentication Server Function (AUSF) 1142, (v) Network Slice Selection Function (NSSF) 1150, (vi) Network Exposure Function (NEF) 1152, (vii) Network Repository Function (NRF) 1154, (viii) Policy Control Function (PCF) 1156, (ix) Unified Data Management (UDM) 1158, and (x) Application Function (AF) 1160. This list of NFs is far from being comprehensive, not including, for example, NFs related to non-3GPP access discussed herein.

In the Control Plane (CP), AMF 1144 is in charge of mobility management along with the possible handovers of a user. SMF 1146 is responsible for maintaining the existing session. AUSF 1142 and UDM 1158 are standardized to create and manage authentication keys to perform UE authentication and authorization. NSSF 1150, NEF 1152, NRF 1154, PCF 1156, and AF 1160 also belong to the CP and are important in many control and management tasks.

In the User Plane (UP), UPF 1148 forwards the traffic between UEs 1102 and Data Network (DN) 1136. Furthermore, SMF 1146 instructs UPF 1148 to create packet detection and forwarding rules. To consume services provided by an MNO, UE 1102 connects over the air interface to the RAN (e.g., the Next-Generation Node B (gNodeB) 1116), and then requests NAS signaling processing at AMF 1144 and PDU session establishment. NFs in SBA communicate to one another over SBI using Hypertext Transfer Protocol (HTTP) and Transport Layer Security (TLS) for a secure connection, or through the reference points using transport and application layer-specific protocols.

An NF exposes and consumes services via reference points using the producer-consumer model. For instance, NAS signaling between UE 1102 and AMF 1144 is performed via N1. The N2 interface is the point-to-point communication between gNodeB 1116 and AMF 1144 and is used for transferring of session management messages. The N3 interface between gNodeB 1116 and UPF 1148 is used for exchanging packets in UP, whereas N11 is used for AMF 1144 and SMF 1146 interactions. The N4 interface is employed by SMF 1146 for sending rules of packet detection and forwarding to UPF 1148. Finally, the N6 interface connects UPF 1148 and DN 1136, which is commonly the Internet.

Most of the time, an information producing NF in a Public Land Mobile Network (PLMN) offers mobile services for UEs connected to a 5G-NR and/or N3AN inside the Home Public Land Mobile Network (HPLMN). For example, the UE consumes services in the same local that the subscriber profile is configured. However, an NF may also offer services for UEs outside HPLMN, such as when they are roaming. As in previous generations, roaming in 5G allows a UE to employ mobile services outside its coverage area or in a Visited Public Land Mobile Network (VPLMN). As used herein, "home network" is used as being equivalent to HPLMN and "visited network" is used to refer to any external network (VPLMN) that provides mobile services to a UE outside its home network.

To support the connectivity of UE via a N3AN, the following types of access are specified: (i) untrusted (e.g., non-3GPP access 1310B of FIG. 13), (ii) trusted (e.g., 3GPP access 1310A of FIG. 13), and (iii) wireline. Untrusted access can be understood as the fact that MNO does not trust in the security offered by the N3AN. Therefore, the traffic should be transported by a secure option from the MNO's point of view. The main component to support the untrusted access network is the Non-3GPP Interworking Function (N3IWF) 130, depicted in FIG. 1C. The role of N3IWF 130, introduced in 3GPP Rel-15, is to act as a gateway for communication between a UE and the 5GC, including when an untrusted network or access point (e.g., untrusted access point 140) is used.

Figure 1B:
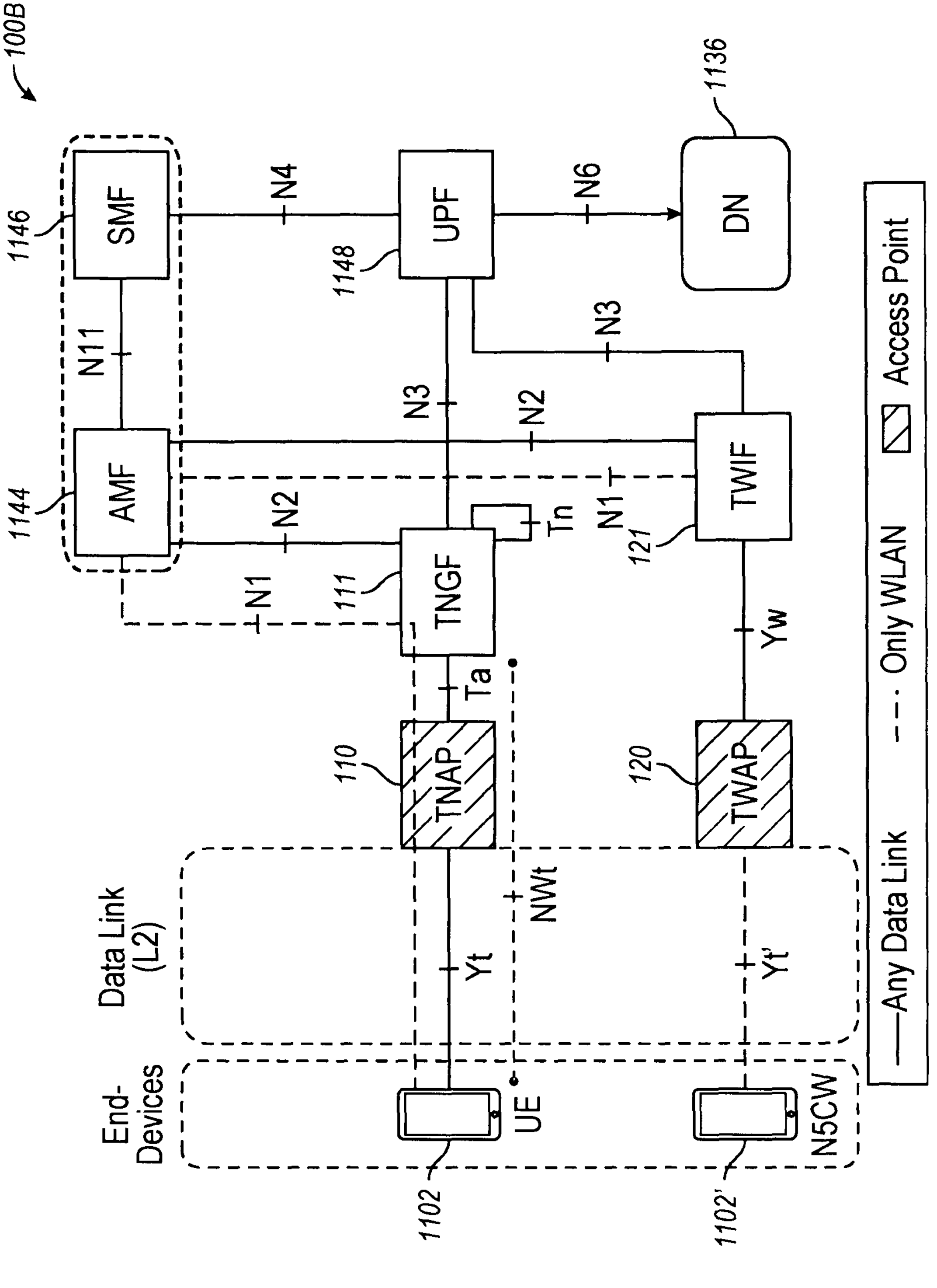
FIG. 1B illustrates an example network architecture with access of a trusted access network via a non-3GPP access network, according to an example.
Figure 1C:
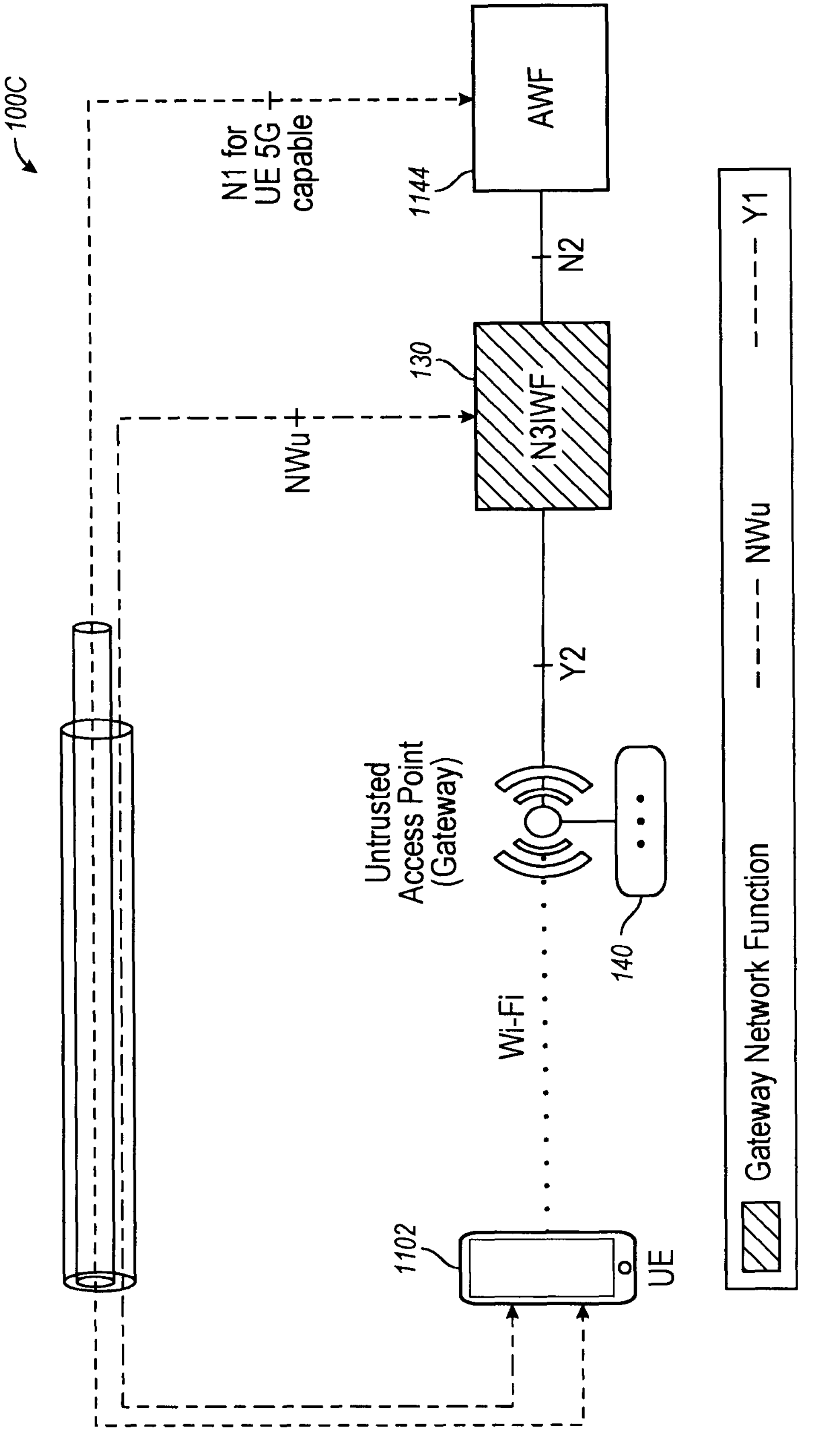
FIG. 1C illustrates an example network architecture with connections for integration between untrusted non-3GPP access network, according to an example.

FIG. 1B illustrates an example network architecture 100B with access of a trusted access network via N3ANs, and FIG. 1C illustrates an example network architecture 100C with integration between untrusted N3ANs, especially WLAN or Wi-Fi networks. Moreover, FIG. 1C shows encrypted IP Security (IPSec) tunnels, called NWu, that are used to secure transport traffic from untrusted non-3GPP access to the 5G core. In addition, the NWu isolates the non-3GPP and 3GPP data.

Trusted access assumes a different relationship between the non-3GPP access and the 5GC in comparison with the untrusted scenario. Although the 3GPP standard does not define the trust level, this can be established with a behavior similar to the 3GPP access. A trusted network indicates that the operator has full control of Trusted Non-3GPP Access Point (TNAP) and the radio link access. Therefore, the encryption is controlled by the operator or there is trust in the security offered by the N3AN. In the architecture of FIG. 1B, TNAP 110 enables UEs 1102 to access the trusted access network by using non-3GPP wireless or wired access technology. A Trusted Non-3GPP Gateway Function (TNGF) 111 exposes N2 and N3 interfaces to allow UE connection to 5GCN over the trusted access network.

A Trusted Non-3GPP Access Network (TNAN) can be implemented as Trusted WLAN Access Network (TWAN) that, in this case, only supports WLAN. TWAN includes Trusted WLAN Access Point (TWAP) and Trusted WLAN Interworking Function (TWIF) 121 to provide trusted connection to 5GCN for UEs such as UE 1102' in a WLAN with no 5G capabilities (e.g., as shown in FIG. 1B). This type of device is called Non-5G Capable over WLAN (NSCW) device 1102' and it depends on TWIF 121 for NAS signaling using an N1 reference point. In FIG. 1B, the two trusted options are illustrated: (i) the connection of UEs such as UE 1102 to the 5GC through a TNAP 110 and TNGF 111, and (ii) the connection of NSCW devices 1102' over WLAN using TWAP 120 and TWIF 121.

Converged multiaccess connectivity is considered as an important technology enabler for enterprise networking. This means connectivity should be provided seamlessly through both licensed (e.g., 3GPP LTE/5G) and unlicensed (e.g., Wi-Fi) bands. The technical advantages include the following: utilizing Wi-Fi infrastructure, without jeopardizing the quality of the connection or being solely dependent on Wi-Fi; simultaneous use of 5G and Wi-Fi capacity, to increase effective capacity; improved User experience, including securing connectivity in times of congestion, and transitions between indoor/outdoor, or failures; resilience, including parallel use of cellular and Wi-Fi, letting the unavailability of one, not leading to loss of connectivity (high reliability in mission critical applications); and/or campus traffic engineering, including access to both bearers, to allow distribution of devices and applications while using infrastructure dynamically and according to appropriate conditions.

In 3GPP, converged multiaccess is specified where Wi-Fi AP is interfaced to 5G core through following architectures: Trusted WLAN Interworking Function (TWIF) 121, Trusted Non-3GPP Gateway Function (TNGF) 111 (see, e.g., FIG. 1B) and Untrusted WLAN access via a Non-3GPP Interworking Function (N3IWF) 130 (see, e.g., FIG. 1C). 3GPP ATSSS (depicted in, e.g., FIGS. 13 and 14) creates multiple tunnels, enabling data delivery between the network and users over both 3GPP and non-3GPP simultaneously.

In ATSSS, four options are supported for steering mode: Active Standby (e.g., the traffic is routed over the default access, unless that becomes unavailable); Smallest Delay (the traffic is sent over the access link with the smallest delay); Load Balancing (a fixed percentage is specified for the fraction of the traffic that should be sent over a respective network); and Priority Based (the traffic is transmitted over a specified high priority access until that access becomes congested or unavailable. The traffic then overflows onto the other access).

Current ATSSS mechanisms do not specify any mechanism for traffic distribution over the two accesses considering link quality, but steering modes are decided by the network and user based on E2E measurements. As a result, a network cannot distribute the traffic according to the link performance in real time. If one access becomes unavailable, the traffic may be switched to the other access; for load balancing, the splitting weight is statically set by the network based on the operators' requirement; for a priority-based mode, the traffic can take over both access resources only when one is congested. The steering modes do not currently adjust the traffic splitting weight dynamically based on the link status, causing handoffs, geofencing, and even business models to have an effect.

The 5G and IT industry currently lack approaches that can map the QoS and perform traffic steering between 5G and Wi-Fi more dynamically based on real-time traffic. Some challenges for efficient traffic management are enabling seamless dynamic traffic routing across multiple networks and guaranteeing E2E quality of service (QoS). The present disclosure describes mechanisms to address these challenges.

Routing with Converged Multi-Access Connectivity

Figure 2A:
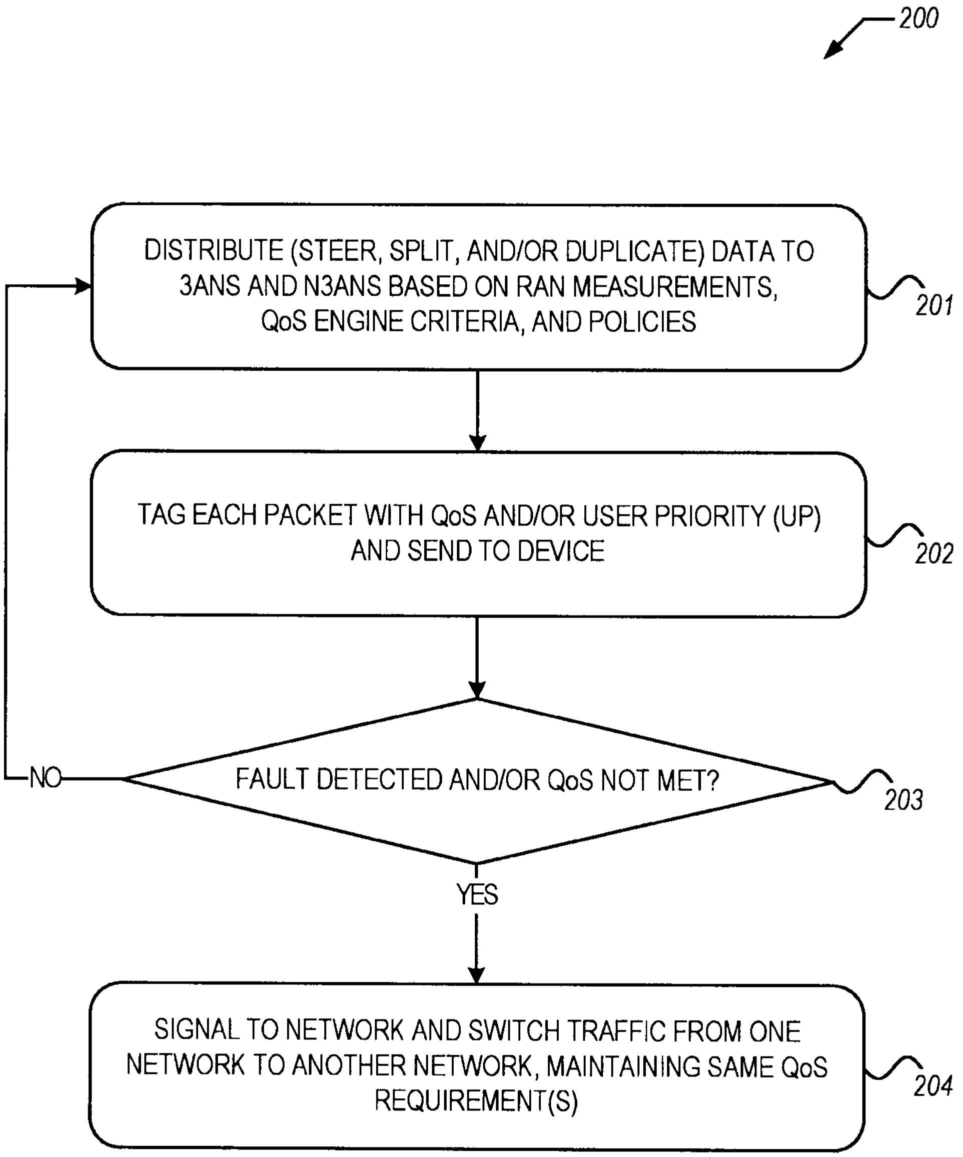
FIG. 2A illustrates a downlink (DL) multiaccess routing process.
Figure 2B:
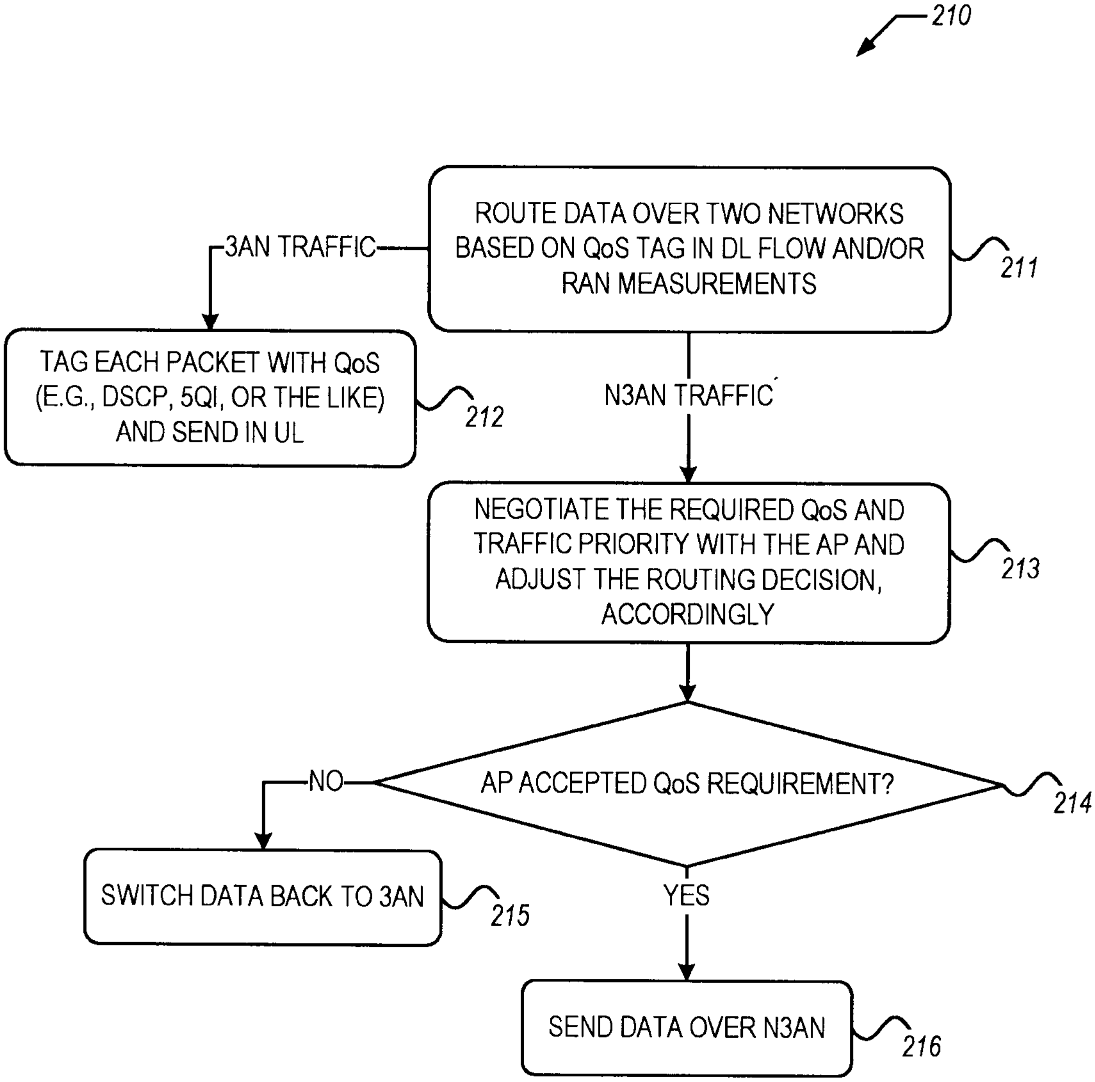
FIG. 2B illustrates an uplink (UL) multiaccess routing process, according to an example.

FIG. 2A illustrates a downlink (DL) multiaccess routing process 200, and FIG. 2B illustrates an uplink (UL) multiaccess routing process 210.

Process 200 begins at operation 201 where the QoS engine (or some other entity or element) steers, splits, and/or duplicates data to 3ANs and N3ANs based on RAN measurements, QoS engine criteria, and policies. At operation 202, the QoS engine (or some other entity or element) tags individual packets with QoS (e.g., DSCP, 5QI, or the like) and/or WLAN UP (e.g., QoS, and/or the like) and send to device. At operation 203, the QoS engine (or some other entity or element) determines whether a fault is detected and/or if QoS not met. If not, the QoS engine (or some other entity or element) proceeds back to operation 201. If a fault is detected and/or QoS is not met, the QoS engine (or some other entity or element) proceeds to operation 204 to signal to the network and switch traffic from one network to another network, maintaining same QoS requirement(s).

Process 210 begins at operation 211 where the QoS engine (or some other entity or element routes data over at least two access networks (e.g., 3AN and N3AN) based on a QoS tag in DL flow and/or RAN measurements. At operation 212, the QoS engine (or some other entity or element) tags individual packets to be routed over 3AN (e.g., 5G or the like) with QoS (e.g., DSCP, 5QI, or the like) and sends in UL. At operation 213, the QoS engine (or some other entity or element) negotiates the required QoS and traffic priority with the N3AN (e.g., WLAN or Wi-Fi) AP and adjusts the routing decision, accordingly. At operation 214, the QoS engine (or some other entity or element) determines whether the N3AN AP accepted QoS requirements or not. If not, the QoS engine (or some other entity or element) switches data back to the 3AN at operation 215. If the QoS requirements were accepted by the N3AN AP, the QoS engine (or some other entity or element) proceeds to operation 216 to send data over the N3AN.

In some implementations, a model-based approach is used for optimization of traffic distribution based on RAN measurements. Additionally or alternatively, an AI/ML engine is used to collect data and predict the best routing decision.

Figure 3:
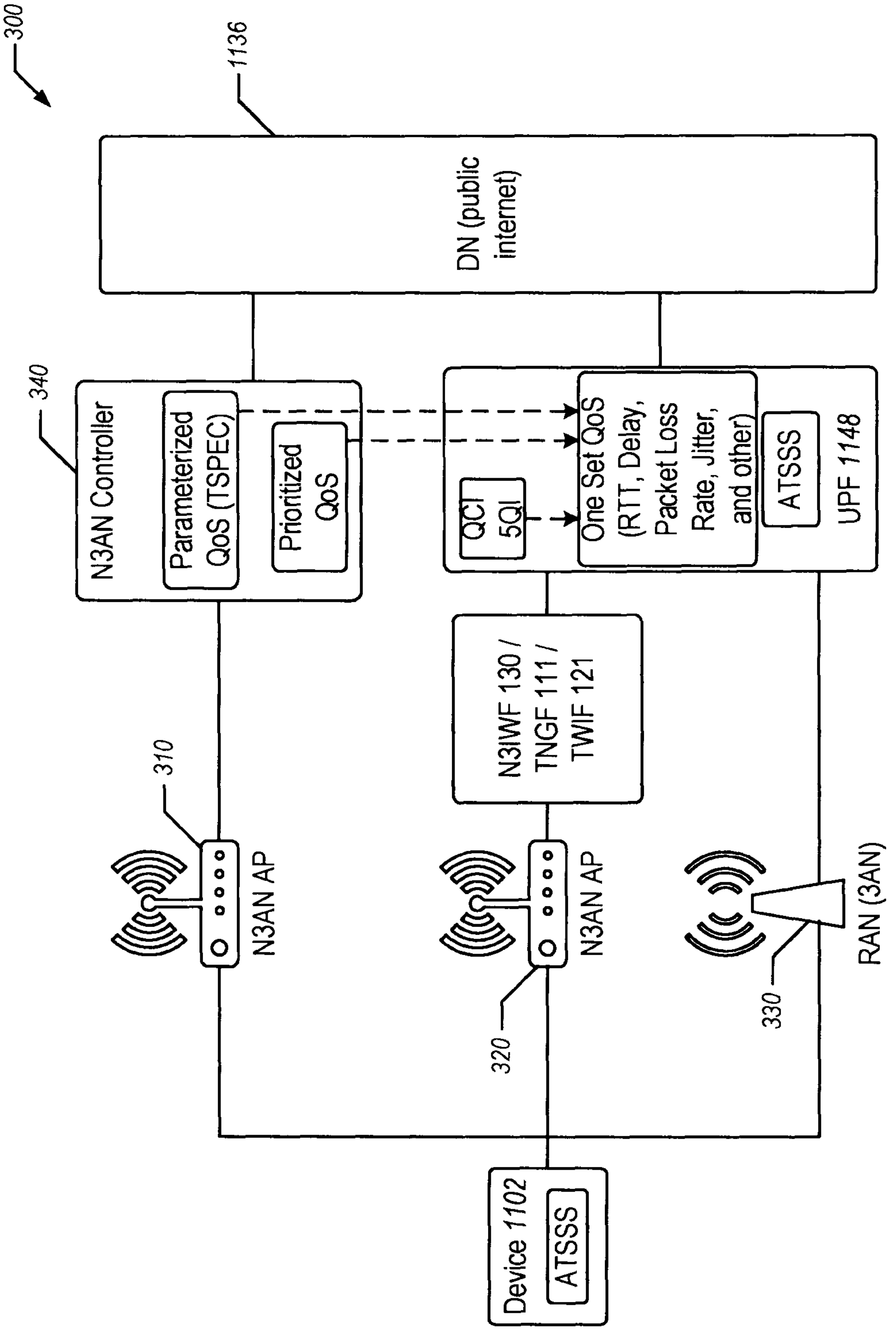
FIG. 3 depicts a mapping of QoS policies in a network architecture, according to an example.

FIG. 3 illustrates an example network architecture 300 where a single set of QoS policies are mapped between N3AN (e.g., Wi-Fi) QoS and 3AN (e.g., 5G) QoS functionality. Here, this shows how a UE 1102 can indirectly connect to a 5G UPF 1148 via a N3AN AP 310 or N3AN AP 320, or can directly connect to the 5G UPF 1148 via the 3AN RAN 330. Also shown is the use of a N3AN controller 340 that provides QoS details to the UPF 1148.

In other examples, proprietary architectures and networking components may be used that do not directly follow 3GPP multiaccess architectures. The enhancements discussed herein thus can be extended to any other network architecture and are not limited to 3GPP architectures.

Adaptive QoS Management Based on Coordinated Resource Reconfigurations

In the context of Edge and Telco networks, work services are moving closer to UE and Devices where resources (compute resources, network resources, etc.) are typically scarce. If resources are not properly sized, then QoS may not be achieved for the given demand for a given service. For instance, a CDN may be required to serve 10 Gbps of video bandwidth a given point of time, but despite having extensive network bandwidth, other resources such as memory I/O (e.g., from drives) may become the bottleneck. Similarly, if there is not enough network bandwidth for a V2X service, it is very likely that latency requirements cannot be achieved.

Multi-tenancy and quality of service becomes specially challenging for edge computing deployments. The number of devices accessing services can drastically vary over time depending on the behavior of the physical infrastructure. For instance, smart cities or large manufacturing facilities may have different type devices (e.g., AMRs, Cars, Phones etc.) constantly moving from different access points (small cells, base stations etc.). These devices may be requesting different services hosted in the edge data center that may have different QoS key performance indicators (KPIs) (e.g., latency, bandwidth etc.) and Service Level Objectives (SLOs) (e.g., frames per second, Mbps of content etc.). In order to achieve these KPIs and SLOs there is a need to provide a certain amount of E2E QoS from the device to the service itself, and also from the network and compute perspective. Because one device can have multiple traffic flows with different QoS requirements as well, the QoS requirements can be established for respective data flows or "QoS flow" in 5G terminology.

Figure 4:
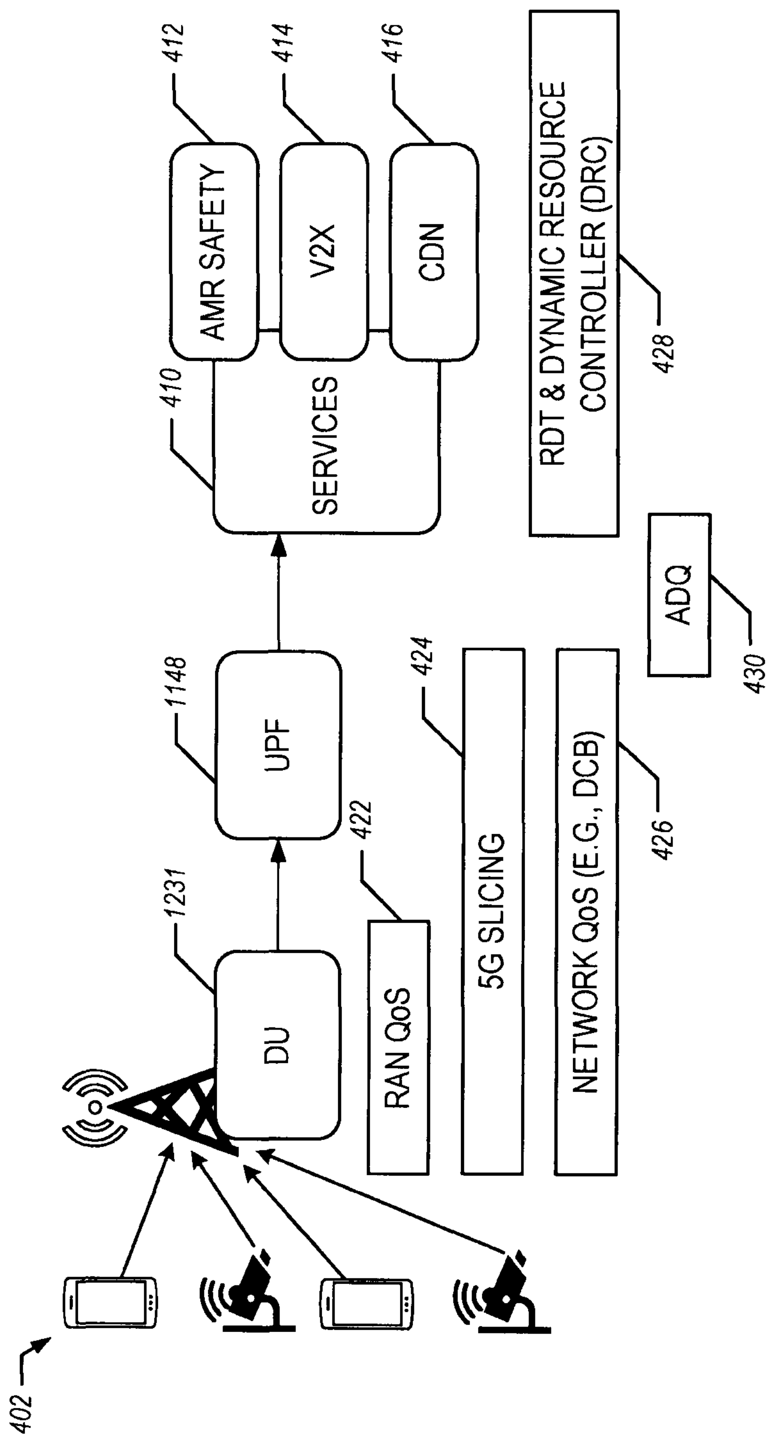
FIG. 4 depicts an example flow of data in a 5G network architecture, according to an example.

FIG. 4 depicts an example flow of data in a 5G network architecture, including the use of multiple service functions. Here, respective user devices 402 connect to a RAN operating via a DU 1231 and a UPF 1148, to ultimately access services 410. Among other examples, such services may relate to: autonomous mobile robot (AMR) safety 412; vehicle-to-everything (V2X) 414; content data network (CDN) 416.

As shown in this FIG. 4, there may be different schemes to enforce resource allocations at different stages of the traffic (among the RAN, 5G, Network, NIC and Compute). These include consideration of: RAN QoS functions 422; 5G slicing 424; Network QoS functions 426; dedicated hardware packet queue (e.g., ADQ) functions 430; Intel® Resource Director Technology (RDT) and Dynamic Resource Controller functions 428; or similar functionality.

Figure 5:
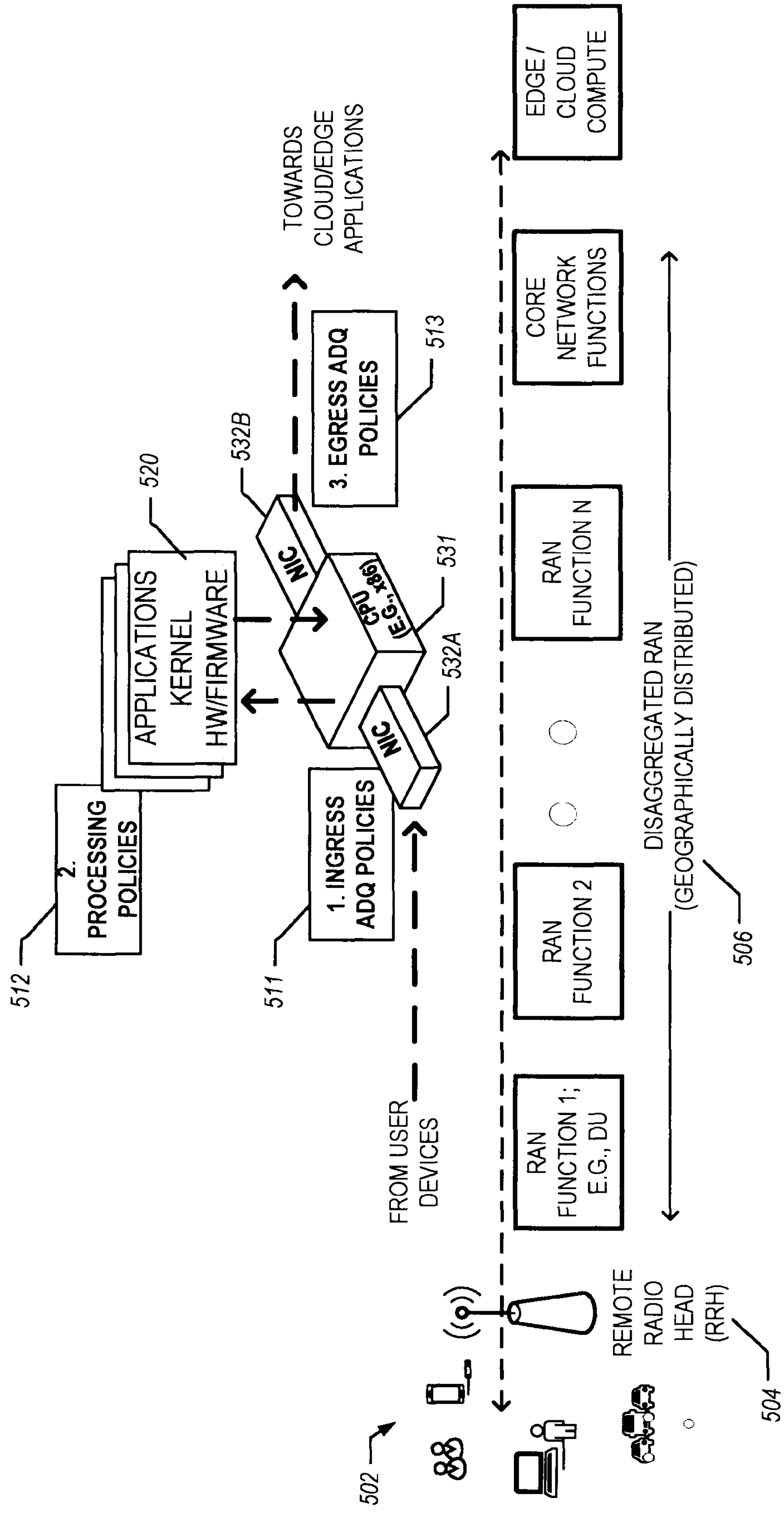
FIG. 5 depicts an example flow of data in a 5G network architecture having a disaggregated RAN, according to an example.

FIG. 5 depicts a similar flow of data in a 5G network architecture that uses a disaggregated RAN 506 (e.g., a RAN provided by geographically distributed network functions). Here, respective user devices 502 connect to a remote radio head (RRH) 504, which provides data among the various RAN functions of the disaggregated RAN 506 such as a DU and core network functions, and is ultimately connected to edge/cloud compute functions.

At each of the network functions, data that is received from the user devices 502 may be processed at a computing unit 531. FIG. 5 shows the receipt of data at an ingress NIC 532A, the processing of the data in the computing unit 531 (e.g., via the use of applications, an operating system kernel, or hardware/firmware functions), and the transmission of processed data towards the cloud/edge compute via an egress NIC 532B.

Within the computing unit, the use of a dedicated hardware packet queue (ADQ) can control QoS based on use of resources at the computing unit 531. For example, ingress ADQ policies 511 can be used to manage packet queues for received data at the ingress NIC 532A; processing policies 512 can be used to manage the processing among the applications, kernel, or hardware/firmware functions in the computing unit 531; egress ADQ policies 513 can be used to manage packet queues for transmitted data at the egress NIC 532B. These policies 511, 512, and 513 may be based on QoS considerations to ensure that the computing unit 531 and the NICs 532 and by extension the disaggregated RAN 506 may meet expected service objectives and can adapt operations so that QoS can be ensured.

With existing approaches, platform-specific service policies are not coordinated, do not have global optimization, and often are tuned locally and statically allocated. Thus, every system has be tuned specific to its hardware and corresponding workload. As a further complexity, previous approaches often require software intervention running in a centralized control plane which is not always possible. Software intervention in many cases is not possible. With other existing approaches, an infrastructure owner can statically enforce network and compute resources to certain services. However, this allocation tends to be static and not capable to react fast enough to changes that occur in real deployments. This leads to inefficiencies and increases total cost of ownership due to oversize of resources, and does not consider true E2E QoS aspects.

The approaches discussed herein provide network coordinated policies, while automatically handling quality of service within E2E ingressing/egressing 5G network communications. This includes coordinating QoS-sensitive resources among other nodes, in a way that is globally optimized, and tuned both locally and globally through learning methods. This also supports dynamically reconfigured policies. The following approaches thus enable an extension of network QoS methods provided by hardware resources, in particular NICs, to establish network QoS in order to automatically configure the 5G software infrastructure.

QoS Management Through NIC Configuration

The following extends features of NICs, using ADQ functionalities in combination with adaptive and autonomous configuration of a 5G stack. This enables a NIC to understand a mapping of services into a 5G network, while performing adaptive QoS shaping of the traffic depending on the bandwidth observed and predicted for the respective services.

Traffic steering/shaping/labeling can be handled as a responsibility of the 5G UPF (User Plane Function), such as by a network switch or node enforcing the policy coming from a 5G SMF (Session Management Function) that contains the PCF (Policy Control Function). UPF interfaces with the application server (called "Data Network") via typical IP/Ethernet protocols. Thus, a NIC is an integral part of the networking fabric that supports the UPF and the DN via multiple nodes within a data center. Further, a NIC configuration can have a meaningful impact on E2E QoS, even though the 5G over-the-air bandwidth/latency/loss may be the dominant bottleneck.

Figure 6:
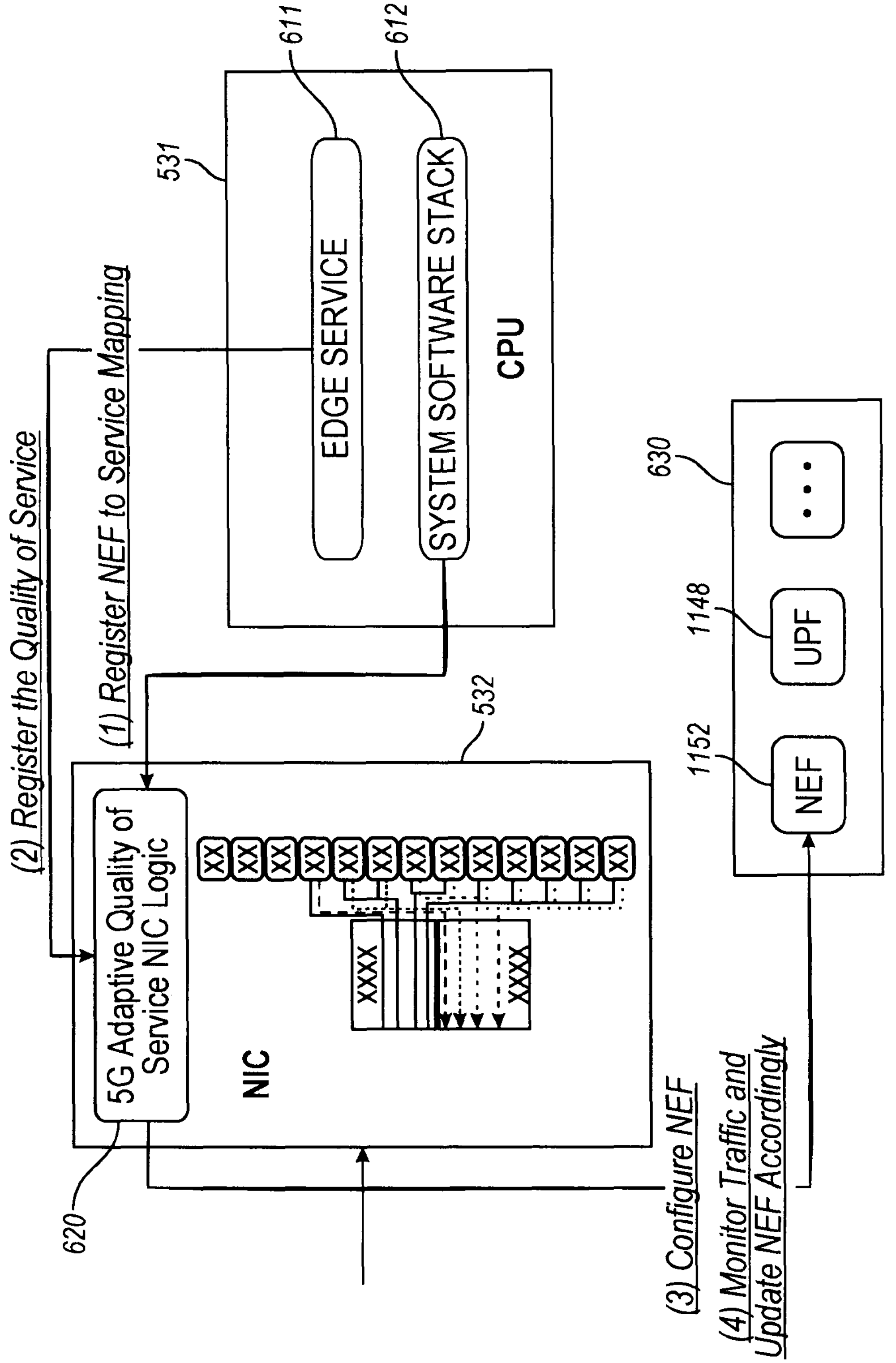
FIG. 6 depicts a 5G network architecture implementing an example workflow for network exposure function management, according to an example.

FIG. 6 depicts an architecture implementing an example workflow for network exposure function (NEF) management within a computing system. Here, a NIC 532 (e.g., the ingress NIC 532A) is part of a computing unit 531 including a CPU, as the CPU operates an edge service 611 and a system software stack 612 on the computing unit 531 CPU. The use of the system software stack 612 and the edge service 611 provides information to a 5G Adaptive QoS Logic 620 engine operating within the NIC that implements the following approach.

In an example, the following operations are executed when an edge service (e.g., the edge service 611) is deployed in a data center that has its data plane connected with 5G access:

1) Register NEF to service mapping. First, the edge service 611 is mapped to a certain hardware packet queue (e.g., ADQ) within the NIC 532 to achieve a certain bandwidth. Cores that are mapped into the packet queue can be set according to the bandwidth needs.
2) Register the quality of service in the NIC. Next, the edge service 611 is mapped into a certain flow in the 5G Core Network 630. For instance, a UPF function (e.g., UPF 1148) and an NEF/AF function (e.g., NEF 1152) within the 5G Core Network interacts with the service application to translate the application requirements into QoS profiles understood by the rest of the 5G network (among entities of the CN and RAN).
3) Configure the NEF. The NIC 532 can help the UPF 1148 to monitor the bandwidth that is utilized by the service itself, which via an API to the NEF 1152, can adaptively configure the 5G network bandwidth according to the current observed bandwidth.
4) Monitor the traffic and update the NEF accordingly. The edge service 611 may result in a change to the system software stack (e.g., via the operating system and orchestration) to set up the NIC 532 to a certain KPI (e.g., a bandwidth KPI). The NIC 532 hardware packet queue (e.g., ADQ) is updated according to the new required bandwidth and required resources. The NIC 532 automatically uses the NEF 1152 to update to the new bandwidth requirements. Then, the configuration operation (3) may be repeated.

It will be understood that this approach may be utilized with additional examples of hardware and NIC adaptation. This includes approaches for scalable adaptive-grained monitoring and telemetry processing for multi-QoS services, multi-criteria approximate real-time content caching for multi-QoS user edge architectures, and QoS global unified inter-dependent multi-tenant QoS CPU schemes. Other edge computing and 5G enhancements may also be used.

Figure 7:
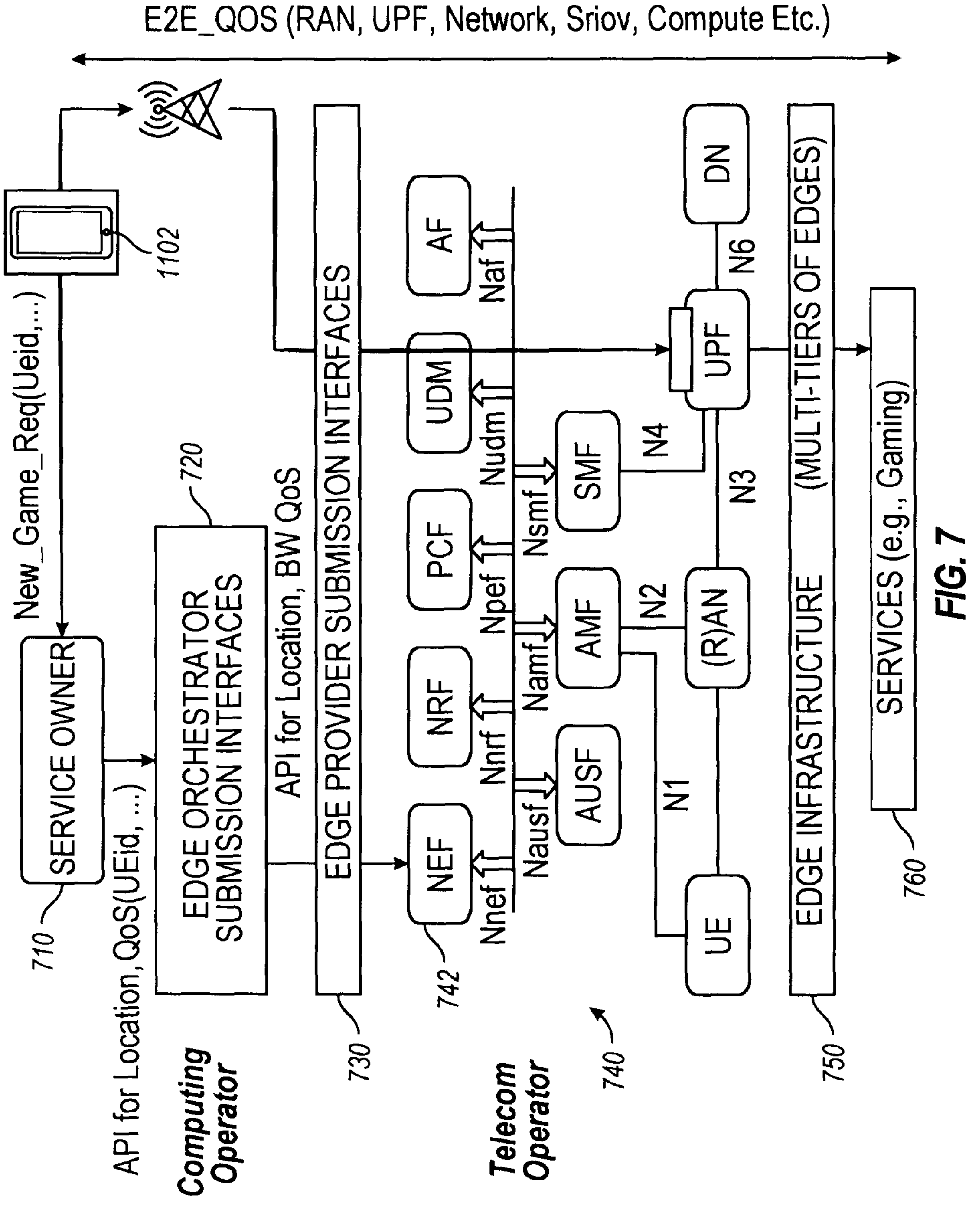
FIG. 7 depicts an architecture for providing QoS in service-based flows of a 5G network, according to an example.

FIG. 7 depicts an architecture for providing QoS in service-based flows of a 5G network. Here, this architecture includes higher level SW stacks for implementing particular service types, such as gaming services 760 delivered to a UE 1102 via a 5G network stack 740. This service architecture is provided while balancing various QoS service-based flow requirements, for end-to-end connectivity to ensure that the service successfully operates (e.g., so that gaming services are delivered with a particular QoS).

In the context of the service requirements for the gaming services 760 FIG. 7, the techniques discussed herein can expand current system capabilities to establish and adapt an autonomous QoS configuration from the service computing platform to the 5G stack. This QoS configuration may be implemented by using existing NIC QoS and capabilities hooks to transparently offer the QoS coordination between the platform and the compatible components.

For example, consider the 5G network stack 740 in FIG. 7, operated by a telecom operator. The 5G network stack 740 is used to provide connectivity to a UE 1102 to access services 760 in an edge infrastructure 750, with such services 760 operated by a service owner 710. In an example, a Network Exposure Function, NEF 742, is configured to allow application services, via exposed APIs, to express or require certain functionalities for QoS in the 5G stack. In particular, the NEF 742 can be extended to use APIs (e.g., edge orchestrator submission interfaces 720, edge provider submission interfaces 730) that allow a NIC associated with the 5G User Plane Function (UPF) to specify a QoS change/addition for any QoS flow from a device or set of devices (e.g., UE 1102) to route traffic for a particular service (e.g., services 760).

In an example, the UPF is responsible for transforming the traffic coming from the RAN into IP traffic that is routed to the platform where the targeted service resides. Similarly, UPF is responsible for managing traffic for the ingressing direction that originates from different services. In the context discussed herein, the UPF may be expanded to use an associated NIC feature for traffic steering/shaping.

Figure 8:
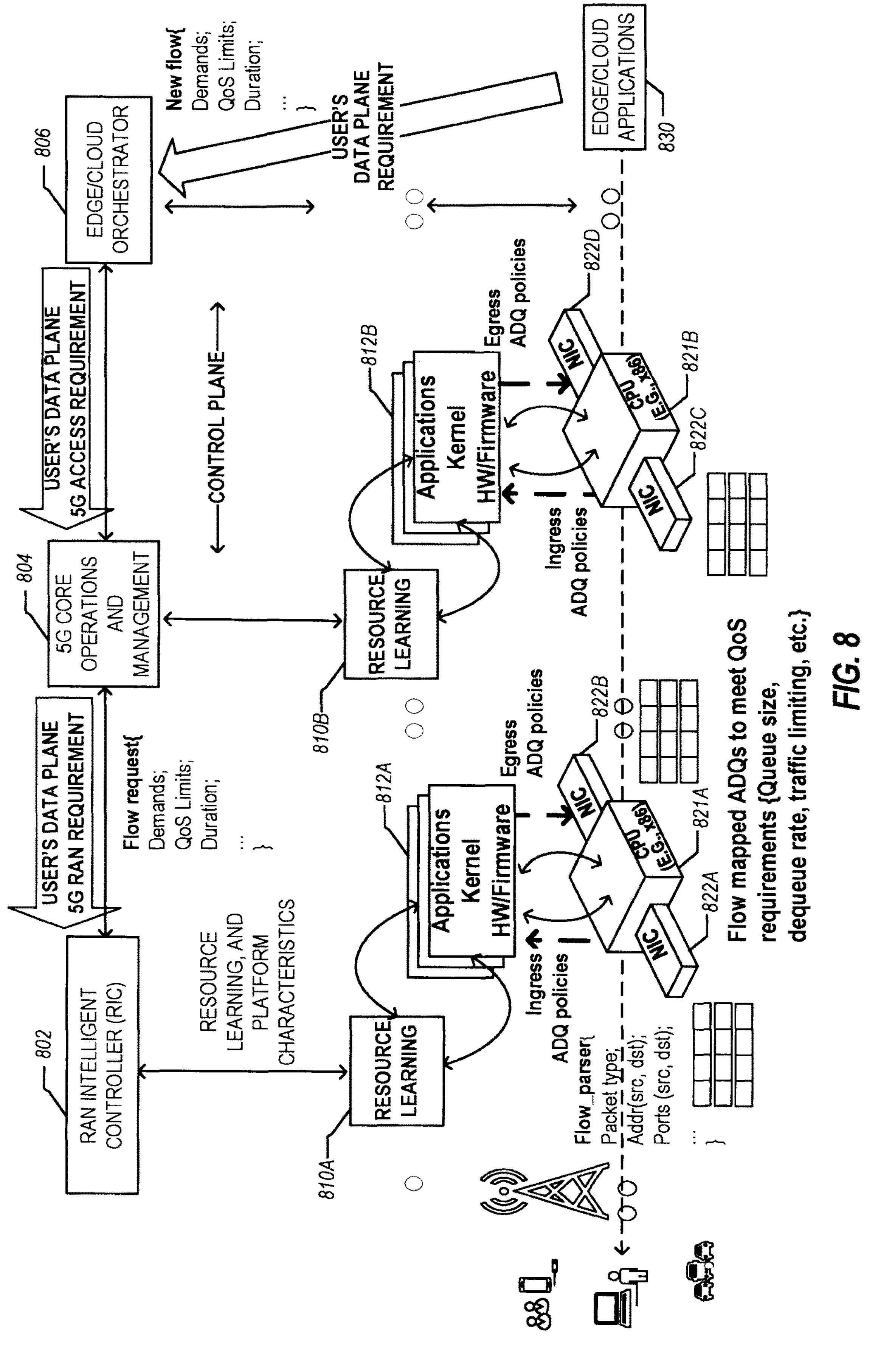
FIG. 8 depicts an enhanced 5G network architecture with managed data flows, according to an example.

FIG. 8 depicts an enhanced 5G network architecture with managed data flows, based on the aspects discussed above with reference to FIGS. 5-7. Here, the enhanced network architecture includes a RAN intelligent controller (RIC) 802, 5G Core operations and management functions 804, and an edge/cloud orchestrator 806. These entities communicate QoS requirements (e.g., 5G access requirements, and 5G RAN requirements) throughout the network, to ensure that respective entities in the distributed RAN can adapt data flows for end-to-end QoS.

The QoS requirements may be based on data plane requirements originating from edge/cloud applications 830 to be delivered by the 5G network. Here, data flows may specify demands, QoS limits, duration, and other characteristics. For instance, consider a first computing unit 821A that operates applications, kernel, or hardware/firmware functions 812A. The RIC 802 provides resource learning and platform characteristics on the data flows to a first resource learning agent 810A. The first resource learning agent 810A evaluates resource characteristics of the functions 812A to determine appropriate packet processing policies at NICs 822A, 822B at the first computing unit 821A. These policies include ingress policies and egress policies at the NICs (ingress NIC 822A, egress NIC 822B). Similarly, a second computing unit 821B operates applications, kernel, or hardware/firmware functions 812B, and the various 5G Core operations and management functions 804 provide resource learning and platform characteristics on the data flows to the second resource learning agent 810B. The second resource learning agent 810B evaluates resource characteristics of the functions 812B to determine appropriate packet processing policies at connected NICs 822C, 822D (e.g., ingress NIC 822C, egress NIC 822D) at the second computing unit 821B. Accordingly, at individual computing units 821A, 821B and connected NICs, flow-mapped hardware packet queues (e.g., ADQs) may be defined to meet QoS requirements. This may include specification of queue size, dequeue rate, traffic limiting characteristics, and the like.

Accordingly, the configuration of FIG. 8 enables an end-to-end adaptive QoS enforcement where, an ADQ feature (or an equivalent hardware packet queue management feature) of a NIC is used to coordinate an end-to-end flow path across multiple network nodes. Such network nodes may span across the 5G infrastructure that includes RAN, 5G core, and edge and cloud compute locations. An end-to-end flow-based reservation can be used to provide the deterministic characteristics across the network infrastructure.

The following refers to additional features of ADQs but it will be understood that other types of hardware packet queues may also be used. In an example, initial/default ADQs are set up based on the priorities and classification of network slicing. However, network slicing on a given node does not necessarily allow flow level resolution to control the resource reservations based on the dynamic requirement of the applications. In 5G, for example, there are only four service slice types, but there may be tens or hundreds of QoS classes (5G QoS Indices, referred to herein as "5QI").

Individual data flows contain the 5QI as part of the QoS profile parameters. The default QoS may be set to a non-GBR (Guaranteed Bit Rate) "best-effort." Respective data flows can be mapped to a unique ADQ that has the QoS characteristics defined that can match the flow demands. In the steady-state operation mode, the properties of ADQs can be dynamically changed to fit the flow demands in coordination with the platform resources.

The properties of ADQs can be correlated with the platform resources such as the CPU, cache, memory, and I/O resources to process the flow on a given network node (RAN, Core, and Edge/Cloud). This correlation is learned through the respective "Resource Learning" agent (e.g., first resource learning agent 810A, second resource learning agent 810B), and the recommended reservations are applied such as through Intel® Resource Director Technology (RDT) and Dynamic Resource Controller functions. When the flow requirements change—and the platform configurations needs to be adapted for new flow demands—both ADQ properties and system parameters are changed to achieve the QoS characteristics based on the Resource Learning agents' recommendations for requirement changes.

Further, during an end-to-end flow setup scenario, an edge/cloud application (e.g., edge/cloud applications 830) makes a request to an edge/cloud orchestrator (e.g., edge/cloud orchestrator 806) on the flow demand. The edge/cloud orchestrator may then propagate the request to an MSO operator, or a private RAN controller and the 5GC OAM controller to enforce the QoS policies on the hardware platform that hosts the RAN and 5G Core. The RIC 802 can also adapt the wireless resources based on the platform resources of RAN and 5GC network nodes.

Figure 9:
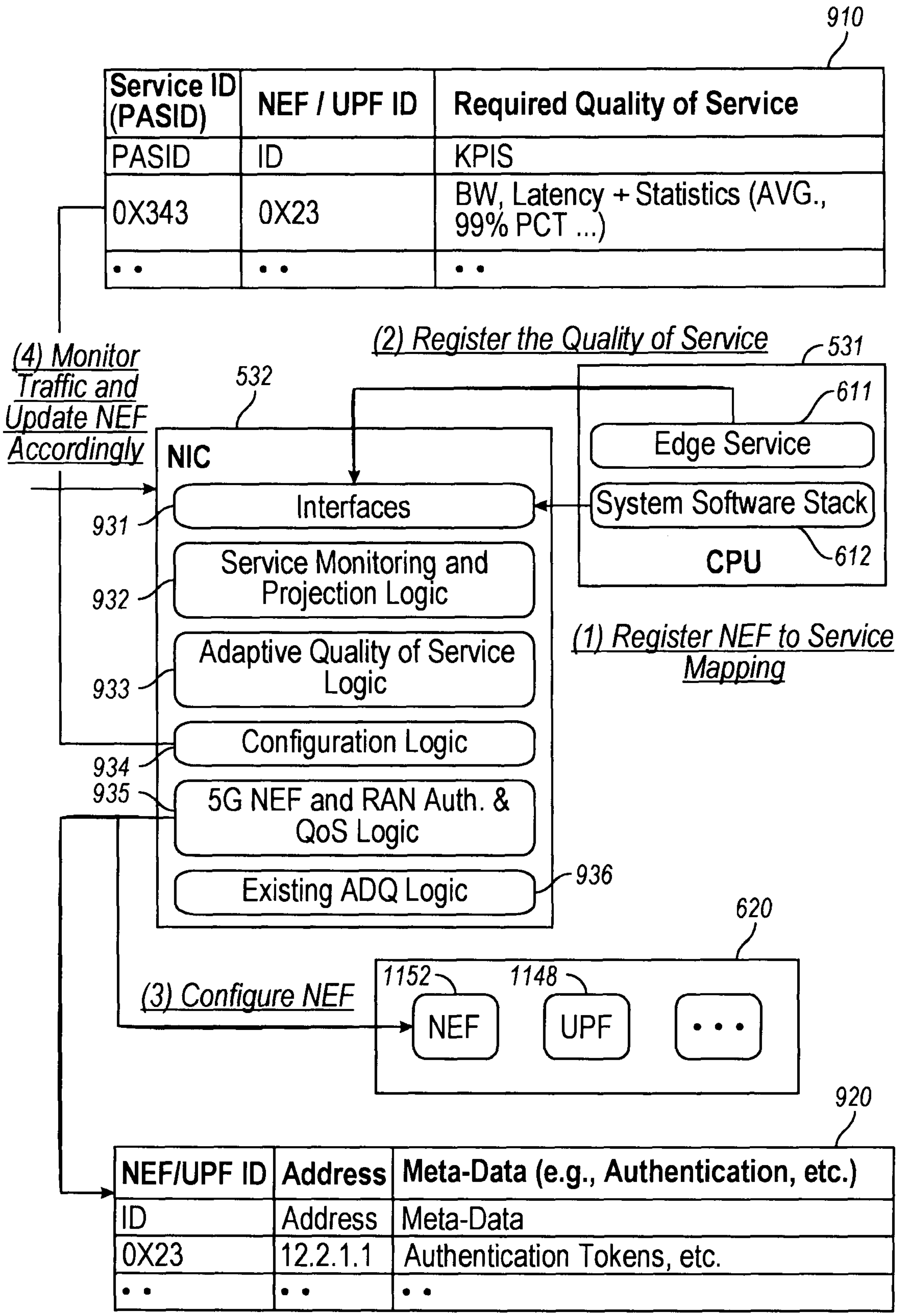
FIG. 9 depicts a 5G network architecture with an example workflow for End-to-End Adaptive Quality of Service, according to an example.

FIG. 9 depicts an architecture of a given node that includes the NIC 532 and the computing unit 531. Here, ADQ logic 936, configuration logic 934, and additional logic 932, 933, 935 are coordinated to provide end-to-end QoS in coordination with the 5G Adaptive QoS Logic 620 provided among the NEF 1152 and the UPF 1148. Similar to the approaches discussed for FIG. 6, the end-to-end QoS is provided by operations including: (1) registering NEF to service mapping; (2) registering the QoS; (3) configuring a NEF (e.g., NEF 1152); and (4) monitoring traffic and updating the NEF accordingly.

In the example of FIG. 9, registration of the NEF 1152 to a service mapping is based on service data values 910 that specify the service ID (PASID), NEF/UPF ID, and a required QoS (with defined characteristics such as bandwidth, latency and statistics, etc.) that is enforced via logic 932, 933, 934, 935, 936. As a result, the NIC 532 may configure the NEF 1152 to coordinate with the UPF 1148 to perform QoS-based bandwidth shaping for the services in the associated data center.

The NIC 532 is expanded to provide hooks that implement bandwidth shaping and related QoS functionality. This may be provided with a set of new interfaces 931 (e.g., including APIs) and logic 932, 933, 934, 935 to establish the configuration. A first interface within interfaces 931 may include an API to register a 5G QoS flow, to enable the NIC 532 to influence operations using the architecture. This API can include: ID of the QoS flow (referred in 3GPP as "QFI" or QoS Flow ID); IP or Address to the UPF; Meta-data that may be needed to establish a secure and trusted connection between the NIC and the UPF; and a set of KPIs or metrics that the given QoS flow needs to be established and modified. A second interface within interfaces 931 may include an API to map a particular service to a given 5G QoS flow. This API can receive data such as: address ID for the service (PASID); ID of the QoS flow; a list of metrics that can be configured and list of ranges that it can utilize (potentially to provide limits). A third interface of interfaces 931 may include an API to allow a service with a particular ID to provide hints or requirements on the service level objective needed. This API may receive data such as: a metric (e.g., bandwidth metric); a statistic (e.g., 99% quantile); or a value.

The adaptive QoS logic 933 is used to implement network bandwidth shaping needed by the services. The adaptive QoS logic 933 coordinates with the 5G SMF/PCF via the NEF 1152 and RAN authentication logic to translate the service requirements into 5G QoS specific configurations. On request (e.g., a request via the interfaces 931) this logic 933 may map an appropriate level of ADQ resources to establish the quality of service, and invoke 5G NEF and RAN Authentication and QoS Logic 935 to work with the SMF/PCF to establish consistent policies between the NIC 532 and the UPF 1148.

The NIC 532 also includes the 5G NEF and RAN authentication and QoS Logic 935. This logic 935 implements an interaction between the NIC 532 and the list of UPFs when respective interfaces (e.g., in interfaces 931) are called, such as to: establish a secure and authenticated connection with the UPF 1148; provide hints or resource enforcement requirements to the UPF 1148 when the system software stack 612 requires changes on any of the metrics, or when the prediction logic within the NIC 532 projects bandwidth based on the historical data for a particular service associated to a particular UPF.

The NIC 532 also includes service monitoring and projection logic 932. The service monitoring and projection logic 932 is used to monitor how a service performs over time, and to potentially implement automatic policies. The service monitoring and projection logic 932 can use existing projection models (such as LSTM neural networks) to implement forecast the network requirements that the edge service 611 may have. In a first example, the service monitoring and projection logic 932 projects that the service may require more bandwidth, so the service monitoring and projection logic 932 proactively increases the bandwidth and monitors whether the traffic increases beyond the previous data points. In a second example, the service monitoring and projection logic 932 identifies that the current bandwidth allocation might be limiting the service (e.g., it is saturating the allocated bandwidth), so the service monitoring and projection logic 932 automatically increase the resources assigned within the quote or limits of the service. In either example, any change in the resource allocation at the NIC automatically also causes a change in the QoS policy configuration.

EXAMPLE METHODS AND IMPLEMENTATION ASPECTS

Figure 10:
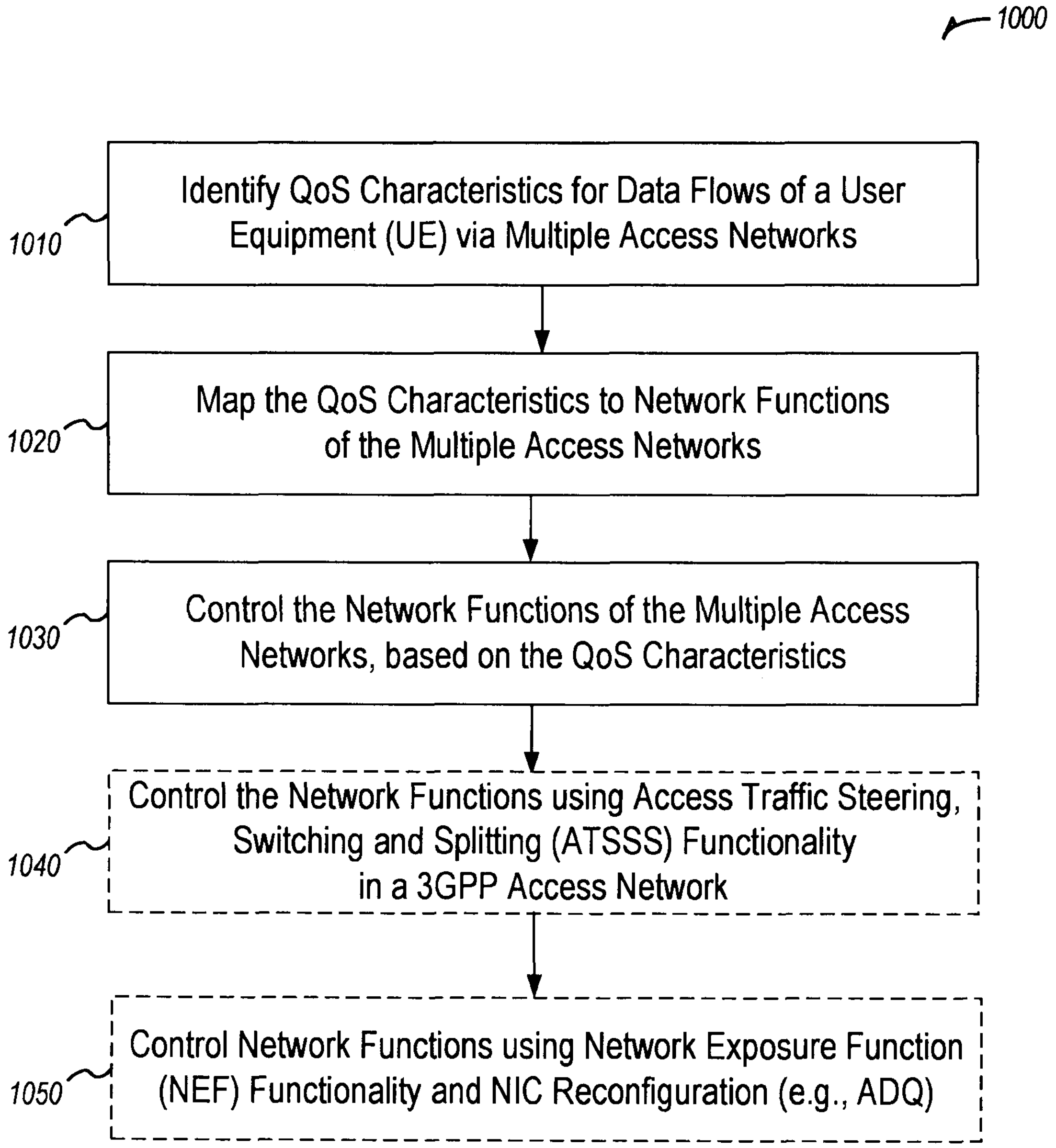
FIG. 10 depicts a flowchart of an example method for providing End-To-End Quality of Service, according to an example.

FIG. 10 depicts a flowchart 1000 of an example method for establishing end-to-end quality of service (QoS) in multiple access networks. This method may be performed or coordinated by at least one computing system, a device within a computing system (also referred to as a "computing device") including a network interface controller or related hardware (e.g., network interface card), or the like.

Operation 1010 includes identifying QoS Characteristics for data flows of a User Equipment (UE), for data flows that are performed via multiple access networks. In an example, the multiple access networks include a 3GPP access network and a non-3GPP access network (such as a Wi-Fi network).

Operation 1020 includes mapping the QoS characteristics to network functions of the multiple access networks.

Operation 1030 includes controlling the network functions of the multiple access networks, based on the QoS characteristics. This control may include the consideration of QoS requirements that relate to at least one of: queue size, dequeue rate, or traffic limits.

Operation 1040 includes an optional workflow for controlling the network functions using Access Traffic Steering, Switching and Splitting (ATSSS) functionality in a 3GPP access network. This may be implemented by an ATSSS functional module or a similar multi-access steering module. In one example, the control of the network functions may include distributing data among using both of the 3GPP access network and the non-3GPP access network, and in response to a fault or QoS requirements not being met, then switching traffic from one of the 3GPP access network and the non-3GPP access network to the other network, while maintaining the QoS requirements on the other network. In another example, the control of the network functions may include controlling routing of data between the 3GPP access network and the non-3GPP access network based on radio access network measurements or a QoS tag used in a downlink flow. Then, QoS requirements and traffic priority may be negotiated in the non-3GPP access network, the routing of data may be adjusted between the 3GPP access network and the non-3GPP access network, based on the negotiated QoS requirements and traffic priority in the non-3GPP access network. For instance, this may include routing the data to the non-3GPP access network in response to an acceptance of the negotiated QoS requirements in the non-3GPP access network, and routing the data to the 3GPP access network in response to rejection of the negotiated QoS requirements in the non-3GPP access network.

Operation 1050 includes an optional workflow for controlling network functions using network exposure function (NEF) functionality and NIC Reconfiguration (e.g., ADQ). In one example, this includes registering a network exposure function of the 3GPP access network to a network service provided to the UE; registering the QoS characteristics to the network service; configuring the network exposure function to meet QoS requirements based on the QoS characteristics; and monitoring traffic in the 3GPP access network and updating a configuration of the network exposure function to meet the QoS requirements based on the QoS characteristics. In a further example, this includes controlling a network interface card controller (NIC) to meet the QoS requirements, and reconfiguration of a dedicated hardware packet queue of the MC. Such a dedicated hardware packet queue may be provided by ADQ (application device queue) functionality and the use of an ingress ADQ policy and an egress ADQ policy, as the ADQ is mapped to data flows to meet the QoS requirements. In still a further example, the network exposure function may be configured to identify changes to meet the QoS requirements using resource learning agents, and wherein the resource learning agents operate at least one model to identify characteristics of the respective resources, the respective resources including at least one of: a software application, an operating system, a firmware configuration, or a hardware configuration.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing device configured to manage Quality of Service (QoS), comprising: processing circuitry; and a memory device including instructions embodied thereon, wherein the instructions, which when executed by the processing circuitry, configure the processing circuitry to cause operations that: identify QoS characteristics for data flows of a user equipment (UE), the data flows performed via multiple access networks; map the QoS characteristics to network functions of at least one of the multiple access networks; and control the network functions of the at least one of the multiple access networks, based on the QoS characteristics, wherein the network functions are implemented at respective resources located within at least one of the multiple access networks.

In Example 2, the subject matter of Example 1 includes subject matter where the multiple access networks include a 3GPP access network and a non-3GPP access network, and wherein the network functions are controlled using Access Traffic Steering, Switching and Splitting (ATSSS) functionality in the 3GPP access network.

In Example 3, the subject matter of Example 2 includes subject matter where the instructions further configure the processing circuitry to cause operations that: distribute data among using both of the 3GPP access network and the non-3GPP access network; and in response to a fault or QoS requirements not being met, then switch traffic from one of the 3GPP access network and the non-3GPP access network to the other network, while maintaining the QoS requirements on the other network.

In Example 4, the subject matter of Examples 2-3 includes subject matter where the instructions further configure the processing circuitry to cause operations that: control routing of data between the 3GPP access network and the non-3GPP access network based on radio access network measurements or a QoS tag used in a downlink flow; negotiate QoS requirements and traffic priority in the non-3GPP access network; and adjust the routing of data between the 3GPP access network and the non-3GPP access network, based on the negotiated QoS requirements and traffic priority in the non-3GPP access network.

In Example 5, the subject matter of Example 4 includes subject matter where the data is routed to the non-3GPP access network in response to an acceptance of the negotiated QoS requirements in the non-3GPP access network, and wherein the data is routed to the 3GPP access network in response to rejection of the negotiated QoS requirements in the non-3GPP access network.

In Example 6, the subject matter of Examples 1-5 includes subject matter where the multiple access networks include a 3GPP access network, and wherein the instructions configure the processing circuitry to cause operations that: register a network exposure function of the 3GPP access network to a network service provided to the UE; register the QoS characteristics to the network service; configure the network exposure function to meet QoS requirements based on the QoS characteristics; and monitor traffic in the 3GPP access network and update a configuration of the network exposure function to meet the QoS requirements based on the QoS characteristics.

In Example 7, the subject matter of Example 6 includes subject matter where the instructions configure the processing circuitry to cause operations that: control an edge processing unit to meet the QoS requirements, wherein the control includes reconfiguration of a dedicated hardware packet queue of the edge processing unit, and wherein the edge processing unit comprises a network interface controller (NIC), smart NIC, infrastructure processing unit (IPU), or data processing unit (DPU).

In Example 8, the subject matter of Example 7 includes subject matter where the dedicated hardware packet queue is an application device queue, wherein the computing device includes an ingress application data queue policy and an egress application data queue policy, and wherein the application device queue is mapped to data flows to meet the QoS requirements.

In Example 9, the subject matter of Examples 6-8 includes subject matter where the QoS requirements relate to at least one of queue size, dequeue rate, or traffic limits.

In Example 10, the subject matter of Examples 6-9 includes subject matter where the network exposure function is further configured to identify changes to meet the QoS requirements using resource learning agents, and wherein the resource learning agents operate at least one model to identify characteristics of the respective resources, the respective resources including at least one of: a software application, an operating system, a firmware configuration, or a hardware configuration.

Example 11 is a method of managing Quality of Service (QoS), comprising: identifying QoS characteristics for data flows of a user equipment (UE), the data flows performed via multiple access networks; mapping the QoS characteristics to network functions of at least one of the multiple access networks; and controlling the network functions of the at least one of the multiple access networks, based on the QoS characteristics, wherein the network functions are implemented at respective resources located within at least one of the multiple access networks.

In Example 12, the subject matter of Example 11 includes subject matter where the multiple access networks include a 3GPP access network and a non-3GPP access network, and wherein the network functions are controlled using Access Traffic Steering, Switching and Splitting (ATSSS) functionality in the 3GPP access network.

In Example 13, the subject matter of Example 12 includes, distributing data using both of the 3GPP access network and the non-3GPP access network; and in response to a fault or QoS requirements not being met, then switching traffic from one of the 3GPP access network and the non-3GPP access network to the other network, while maintaining the QoS requirements on the other network.

In Example 14, the subject matter of Examples 12-13 includes, controlling routing of data between the 3GPP access network and the non-3GPP access network based on radio access network measurements or a QoS tag used in a downlink flow; negotiating QoS requirements and traffic priority in the non-3GPP access network; and adjusting the routing of data between the 3GPP access network and the non-3GPP access network, based on the negotiated QoS requirements and traffic priority in the non-3GPP access network.

In Example 15, the subject matter of Example 14 includes subject matter where the data is routed to the non-3GPP access network in response to an acceptance of the negotiated QoS requirements in the non-3GPP access network, and wherein the data is routed to the 3GPP access network in response to rejection of the negotiated QoS requirements in the non-3GPP access network.

In Example 16, the subject matter of Examples 11-15 includes subject matter where the multiple access networks include a 3GPP access network, and wherein the method further comprises: registering a network exposure function of the 3GPP access network to a network service provided to the UE; registering the QoS characteristics to the network service; configuring the network exposure function to meet QoS requirements based on the QoS characteristics; and monitoring traffic in the 3GPP access network and update a configuration of the network exposure function to meet the QoS requirements based on the QoS characteristics.

In Example 17, the subject matter of Example 16 includes, controlling an edge processing unit to meet the QoS requirements, wherein the control includes reconfiguration of a dedicated hardware packet queue of the edge processing unit, and wherein the edge processing unit comprises a network interface controller (NIC), smart NIC, infrastructure processing unit (IPU), or data processing unit (DPU).

In Example 18, the subject matter of Example 17 includes subject matter where the dedicated hardware packet queue is an application device queue, wherein the method is performed by a device that includes an ingress application data queue policy and an egress application data queue policy, and wherein the application device queue is mapped to data flows to meet the QoS requirements.

In Example 19, the subject matter of Examples 16-18 includes subject matter where the QoS requirements relate to at least one of queue size, dequeue rate, or traffic limits.

In Example 20, the subject matter of Examples 16-19 includes subject matter where the network exposure function is further configured to identify changes to meet the QoS requirements using resource learning agents, and wherein the resource learning agents operate at least one model to identify characteristics of the respective resources, the respective resources including at least one of: a software application, an operating system, a firmware configuration, or a hardware configuration.

Example 21 is at least one non-transitory machine-readable storage medium comprising instructions stored thereupon, which when executed by processing circuitry of a computing machine, cause the processing circuitry to perform the methods of any one or more of Examples 11 to 20.

Example 22 is at least one computer-readable medium including computer-executable instructions that, when executed by circuitry of a computing device, cause or configure the circuitry to perform operations to implement of any of Examples 1-21.

Example 23 is an apparatus comprising respective means to implement of any of Examples 1-21.

Example 24 is a system to implement of any of Examples 1-21.

Example 25 is a method to implement of any of Examples 1-21.

Example Cellular Network Architectures and Aspects

Figure 11:
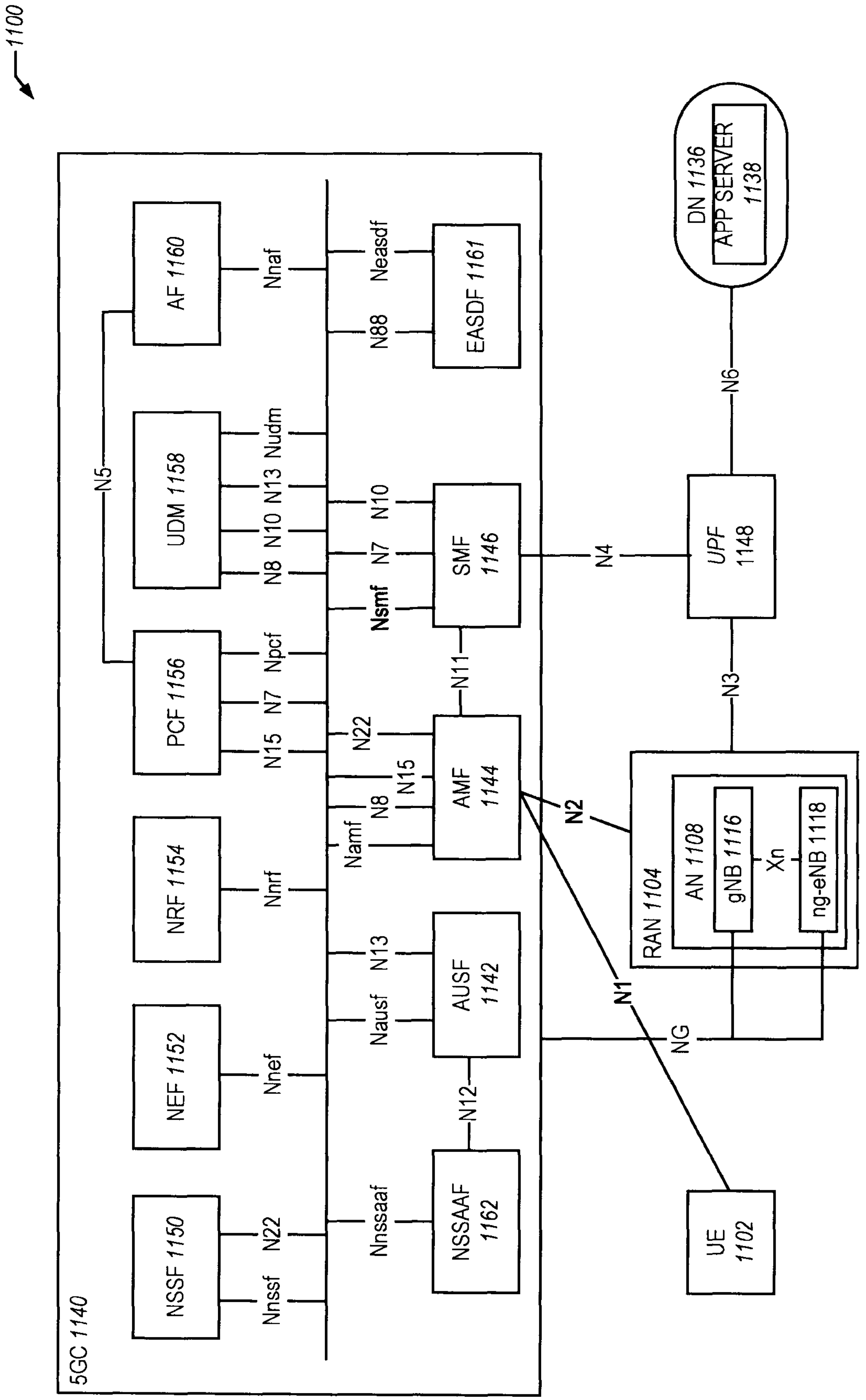
FIG. 11 illustrates a network architecture, according to an example.

FIG. 11 illustrates an example architecture of a network 1100 according to various embodiments. The network 1100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1100 includes a UE 1102, which is any mobile or non-mobile computing device designed to communicate with a RAN 1104 via an over-the-air connection. The UE 1102 is communicatively coupled with the RAN 1104 by a Uu interface, which may be applicable to both LTE and NR systems. Examples of the UE 1102 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 1100 may include a plurality of UEs such as UE 1102 coupled directly with one another via a D2D, ProSe, PC5, and/or sidelink (SL) interface. These UEs 1102 may be M2M/D2D/MTC/IoT devices and/or vehicular systems that communicate using physical sidelink channels such as, but not limited to, PSBCH, PSDCH, PSSCH, PSCCH, PSFCH, and the like. The UE 1102 may perform blind decoding attempts of SL channels/links according to the various embodiments herein.

In some embodiments, the UE 1102 may additionally communicate with an AP 1106 via an over-the-air (OTA) connection. The AP 1106 manages a WLAN connection, which may serve to offload some/all network traffic from the RAN 1104. The connection between the UE 1102 and the AP 1106 may be consistent with any IEEE 802.11 protocol. Additionally, the UE 1102, RAN 1104, and AP 1106 may utilize cellular-WLAN aggregation/integration (e.g., LWA/LWIP). Cellular-WLAN aggregation may involve the UE 1102 being configured by the RAN 1104 to utilize both cellular radio resources and WLAN resources.

The RAN 1104 includes one or more access network nodes (ANs) 1108. The ANs 1108 terminate air-interface(s) for the UE 1102 by providing access stratum protocols including RRC, PDCP, RLC, MAC, and PHY/L1 protocols. In this manner, the AN 1108 enables data/voice connectivity between CN 1120 and the UE 1102. The ANs 1108 may be a macrocell base station or a low power base station for providing femtocells, picocells or other like cells having smaller coverage areas, smaller user capacity, or higher bandwidth compared to macrocells; or some combination thereof. In these implementations, an AN 1108 be referred to as a BS, gNB 1116, RAN node, eNB, ng-eNB 1118, NodeB, roadside unit (RSU), TRxP, and the like.

One example implementation is a "CU/DU split" architecture where the ANs 1108 are embodied as a gNB-Central Unit (CU) that is communicatively coupled with one or more gNB-Distributed Units (DUs), where a DU may be communicatively coupled with one or more Radio Units (RUs) (also referred to as RRHs, RRUs, or the like). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 1108 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 1104 is an LTE RAN or Evolved Universal Terrestrial Radio Access Network (E-UTRAN) 1110) or an Xn interface (if the RAN 1104 is a NG-RAN 1114). The X2/Xn interfaces, which may be separated into control/user plane interfaces in some embodiments, may allow the ANs to communicate information related to handovers, data/context transfers, mobility, load management, interference coordination, and the like.

The ANs of the RAN 1104 may manage one or more cells, cell groups, component carriers, and the like to provide the UE 1102 with an air interface for network access. The UE 1102 may be simultaneously connected with a plurality of cells provided by the same or different ANs 1108 of the RAN 1104. For example, the UE 1102 and RAN 1104 may use carrier aggregation to allow the UE 1102 to connect with a plurality of component carriers, each corresponding to a Pcell or Scell. In dual connectivity scenarios, a first AN 1108 may be a controlling node that provides an MCG and a second AN 1108 may be secondary node that provides an SCG. The first/second ANs 1108 may be any combination of eNB, gNB, ng-eNB, and the like.

The RAN 1104 may provide the air interface over a licensed spectrum or an unlicensed spectrum. To operate in the unlicensed spectrum, the nodes may use LAA, eLAA, and/or feLAA mechanisms based on CA technology with Pcells/Scells. Prior to accessing the unlicensed spectrum, the nodes may perform medium/carrier-sensing operations based on, for example, a listen-before-talk (LBT) protocol.

In V2X scenarios the UE 1102 or AN 1108 may be or act as a roadside unit (RSU), which may refer to any transportation infrastructure entity used for V2X communications. An RSU may be implemented in or by a suitable AN or a stationary (or relatively stationary) UE. An RSU implemented in or by a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In examples where the RAN 1104 is an E-UTRAN with one or more eNBs, the E-UTRAN provides an LTE air interface (Uu) with the parameters and characteristics at least as discussed in 3GPP TS 36.600. In examples where the RAN 1104 is a next generation (NG)-RAN with a set of gNBs 1116. A gNB 1116 connects with 5G-enabled UEs 1102 using a 5G-NR air interface (which may also be referred to as a Uu interface) with parameters and characteristics as discussed above, among many other 3GPP standards. Where the NG-RAN 1114 includes a set of ng-eNBs 1118, the one or more ng-eNBs 1118 connect with a UE 1102 via the 5G Uu and/or LTE Uu interface. The gNBs 1116 and the ng-eNBs 1118 connect with the 5GC 1140 through respective NG interfaces, which include an N2 interface, an N3 interface, and/or other interfaces. The gNB 1116 and the ng-eNB 1118 are connected with each other over an Xn interface. Additionally, individual gNBs 1116 are connected to one another via respective Xn interfaces, and individual ng-eNBs 1118 are connected to one another via respective Xn interfaces. In some examples, the NG interface may be split into two parts, an NG user plane (NG-U) interface, which carries traffic data between the nodes of the NG-RAN and a UPF 1148 (e.g., N3 interface), and an NG control plane (NG-C) interface, which is a signaling interface between the nodes of the NG-RAN and an AMF 1144 (e.g., N2 interface).

The NG-RAN 1114 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

The 5G-NR air interface may utilize BWPs for various purposes. For example, BWP can be used for dynamic adaptation of the SCS. For example, the UE 1102 can be configured with multiple BWPs where a respective BWP configuration has a different SCS. When a BWP change is indicated to the UE 1102, the SCS of the transmission is changed as well. Another use case example of BWP is related to power saving. In particular, multiple BWPs can be configured for the UE 1102 with different amount of frequency resources (e.g., PRBs) to support data transmission under different traffic loading scenarios. A BWP containing a smaller number of PRBs can be used for data transmission with small traffic load while allowing power saving at the UE 1102 and in some cases at the gNB 1116. A BWP containing a larger number of PRBs can be used for scenarios with higher traffic load.

In some implementations, individual gNBs 1116 can include a gNB-CU and a set of gNB-DUs. Additionally or alternatively, gNBs 1116 can include one or more RUs. In these implementations, the gNB-CU may be connected to a gNB-DU via respective F1 interfaces. In case of network sharing with multiple cell ID broadcast(s), each cell identity associated with a subset of PLMNs corresponds to a gNB-DU and the gNB-CU it is connected to, and shares the same physical layer cell resources. For resiliency, a gNB-DU may be connected to multiple gNB-CUs by appropriate implementation. Additionally, a gNB-CU can be separated into gNB-CU control plane (gNB-CU-CP) and gNB-CU user plane (gNB-CU-UP) functions. The gNB-CU-CP is connected to a gNB-DU through an F1 control plane interface (F1-C), the gNB-CU-UP is connected to the gNB-DU through an F1 user plane interface (F1-U), and the gNB-CU-UP is connected to the gNB-CU-CP through an E1 interface. In some implementations, one gNB-DU is connected to only one gNB-CU-CP, and one gNB-CU-UP is connected to only one gNB-CU-CP. For resiliency, a gNB-DU and/or a gNB-CU-UP may be connected to multiple gNB-CU-CPs by appropriate implementation. One gNB-DU can be connected to multiple gNB-CU-UPs under the control of the same gNB-CU-CP, and one gNB-CU-UP can be connected to multiple DUs under the control of the same gNB-CU-CP. Data forwarding between gNB-CU-UPs during intra-gNB-CU-CP handover within a gNB may be supported by Xn-U.

Similarly, individual ng-eNBs 1118 can include an ng-eNB-CU and a set of ng-eNB-DUs. In these implementations, the ng-eNB-CU and each ng-eNB-DU are connected to one another via respective W1 interface. An ng-eNB can include an ng-eNB-CU-CP, one or more ng-eNB-CU-UP(s), and one or more ng-eNB-DU(s). An ng-eNB-CU-CP and an ng-eNB-CU-UP is connected via the E1 interface. An ng-eNB-DU is connected to an ng-eNB-CU-CP via the W1-C interface, and to an ng-eNB-CU-UP via the W1-U interface. The general principle described herein with respect to gNB aspects also applies to ng-eNB aspects and corresponding E1 and W1 interfaces, if not explicitly specified otherwise.

The node hosting the user plane part of the PDCP protocol layer (e.g., gNB-CU, gNB-CU-UP, and for EN-DC, MeNB or SgNB depending on the bearer split) performs user inactivity monitoring and further informs its inactivity or (re)activation to the node having control plane connection towards the core network (e.g., over E1, X2, or the like). The node hosting the RLC protocol layer (e.g., gNB-DU) may perform user inactivity monitoring and further inform its inactivity or (re)activation to the node hosting the control plane (e.g., gNB-CU or gNB-CU-CP).

In these implementations, the NG-RAN, is layered into a Radio Network Layer (RNL) and a Transport Network Layer (TNL). The NG-RAN architecture (e.g., the NG-RAN logical nodes and interfaces between them) is part of the RNL. For a respective NG-RAN interface (e.g., NG, Xn, F1, and the like) the related TNL protocol and the functionality are specified, for example, in 3GPP TS 38.401. The TNL provides services for user plane transport and/or signaling transport. In NG-Flex configurations, a respective NG-RAN node is connected to all AMFs 1144 of AMF sets within an AMF region supporting at least one slice also supported by the NG-RAN node. The AMF Set and the AMF Region may be defined according to 3GPP TS 23.501.

The RAN 1104 is communicatively coupled to a core network (CN) that includes network elements and/or network functions (NFs) to provide various functions to support data and telecommunications services to customers/subscribers (e.g., UE 1102). The components of the CN may be implemented in one physical node or separate physical nodes. In some embodiments, NFV may be utilized to virtualize any or all of the functions provided by the network elements of the CN onto physical compute/storage resources in servers, switches, and the like. A logical instantiation of the CN may be referred to as a network slice, and a logical instantiation of a portion of the CN may be referred to as a network sub-slice.

The CN may be an LTE CN (also referred to as an Evolved Packet Core (EPC)). The EPC may include MME, SGW, SGSN, HSS, PGW, and PCRF coupled with one another over interfaces (or "reference points") as shown. The NFs in the EPC are briefly introduced as follows:

The MME implements mobility management functions to track a current location of the UE to facilitate paging, bearer activation/deactivation, handovers, gateway selection, authentication, and the like. The SGW terminates an S1 interface toward the RAN 1110 and routes data packets between the RAN 1110 and the EPC. The SGW may be a local mobility anchor point for inter-RAN node handovers and also may provide an anchor for inter-3GPP mobility. Other responsibilities may include lawful intercept, charging, and some policy enforcement. The SGSN tracks a location of the UE 1102 and performs security functions and access control. The SGSN also performs inter-EPC node signaling for mobility between different RAT networks; PDN and S-GW selection as specified by MME; MME selection for handovers; and the like. The S3 reference point between the MME and the SGSN enable user and bearer information exchange for inter-3AN mobility in idle/active states. The HSS includes a database for network users, including subscription-related information to support the network entities' handling of communication sessions. The HSS can provide support for routing/roaming, authentication, authorization, naming/addressing resolution, location dependencies, and the like. An S6a reference point between the HSS and the MME may enable transfer of subscription and authentication data for authenticating/authorizing user access to the EPC. The PGW may terminate an SGi interface toward a data network (DN) 1136 that may include an application (app)/content server 1138. The PGW routes data packets between the EPC and the data network DN 1136. The PGW is communicatively coupled with the SGW by an S5 reference point to facilitate user plane tunneling and tunnel management. The PGW may further include a node for policy enforcement and charging data collection (e.g., PCEF). Additionally, the SGi reference point may communicatively couple the PGW with the same or different data network 1136. The PGW may be communicatively coupled with a PCRF via a Gx reference point. The PCRF is the policy and charging control element of the EPC. The PCRF is communicatively coupled to the app/content server 1138 to determine appropriate QoS and charging parameters for service flows. The PCRF also provisions associated rules into a PCEF (via Gx reference point) with appropriate TFT and QCI.

In this examples, the CN is a 5GC 1140 including an Authentication Server Function (AUSF) 1142, Access and Mobility Management Function (AMF) 1144, Session Management Function (SMF) 1146, NSSF 1150, Network Exposure Function (NEF) 1152, Network Repository Function (NRF) 1154, Policy Control Function (PCF) 1156, Unified Data Management (UDM) 1158, Application Function (AF) 1160 (e.g., which may include an Time Sensitive Networking AF (TSN AF)), an Edge Application Server Discovery Function (EASDF) 1161 a Network Slice-specific and SNPN Authentication and Authorization Function (NSSAAF) 1162 coupled with one another over various interfaces as shown. The 5G System architecture also includes a User Plane Function (UPF) 1148, as well as other NFs not shown by FIG. 11 including, for example, Network Slice Admission Control Function (NSACF), 5G-Equipment Identity Register (5G-EIR), UE radio Capability Management Function (UCMF), Time Sensitive Communication and Time Synchronization Function (TSCTSF), Non-Seamless WLAN Offload Function (NSWOF), Service Communication Proxy (SCP), Security Edge Protection Proxy (SEPP), Non-3GPP InterWorking Function (N3IWF) 130, Trusted Non-3GPP Gateway Function (TNGF) 111, Wireline Access Gateway Function (W-AGF), and Trusted WLAN Interworking Function (TWIF) 121, the details of which are discussed in 3GPP TS 23.501. The NFs in the 5GC 1140 are briefly introduced as follows.

The AUSF 1142 stores data for authentication of UE 1102 and handle authentication-related functionality. The AUSF 1142 may facilitate a common authentication framework for various access types.

The AMF 1144 allows other functions of the 5GC 1140 to communicate with the UE 1102 and the RAN 1104 and to subscribe to notifications about mobility events with respect to the UE 1102. The AMF 1144 is also responsible for registration management (e.g., for registering UE 1102), connection management, reachability management, mobility management, lawful interception of AMF-related events, and access authentication and authorization. The AMF 1144 provides transport for SM messages between the UE 1102 and the SMF 1146, and acts as a transparent proxy for routing SM messages. AMF 1144 also provides transport for SMS messages between UE 1102 and an SMSF. AMF 1144 interacts with the AUSF 1142 and the UE 1102 to perform various security anchor and context management functions. Furthermore, AMF 1144 is a termination point of a RAN-CP interface, which includes the N2 reference point between the RAN 1104 and the AMF 1144. The AMF 1144 is also a termination point of NAS (N1) signaling and performs NAS ciphering and integrity protection.

AMF 1144 also supports NAS signaling with the UE 1102 over an N3IWF interface. The N3IWF 130 (see FIG. 1C) provides access to untrusted entities. N3IWF 130 may be a termination point for the N2 interface between the RAN 1104 and the AMF 1144 for the control plane, and may be a termination point for the N3 reference point between the RAN 1114 and the 1148 for the user plane. As such, the AMF 1144 handles N2 signaling from the SMF 1146 and the AMF 1144 for PDU sessions and QoS, encapsulate/de-encapsulate packets for IPSec and N3 tunneling, marks N3 user-plane packets in the uplink, and enforces QoS corresponding to N3 packet marking taking into account QoS requirements associated with such marking received over N2. N3IWF 130 may also relay UL and DL control-plane NAS signaling between the UE 1102 and AMF 1144 via an N1 reference point between the UE 1102 and the AMF 1144, and relay uplink and downlink user-plane packets between the UE 1102 and UPF 1148. The N3IWF 130 also provides mechanisms for IPsec tunnel establishment with the UE 1102. The AMF 1144 may exhibit an Namf service-based interface, and may be a termination point for an N14 reference point between two AMFs 1144 and an N17 reference point between the AMF 1144 and a 5G-EIR (not shown by FIG. 11).

The SMF 1146 is responsible for SM (e.g., session establishment, tunnel management between UPF 1148 and AN 1108); UE IP address allocation and management (including optional authorization); selection and control of UP function; configuring traffic steering at UPF 1148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1144 over N2 to AN 1108; and determining SSC mode of a session. SM refers to management of a PDU session, and a PDU session or "session" refers to a PDU connectivity service that provides or enables the exchange of PDUs between the UE 1102 and the DN 1136. The SMF 1146 may also include the following functionalities to support edge computing enhancements (see, e.g., 3GPP TS 23.548): selection of EASDF 1161 and provision of its address to the UE as the DNS server for the PDU session; usage of EASDF 1161 services as defined in 3GPP TS 23.558; and for supporting the application layer architecture defined in 3GPP TS 23.558, provision and updates of ECS address configuration information to the UE. Discovery and selection procedures for EASDFs 1161 is discussed in 3GPP TS 23.501.

The UPF 1148 acts as an anchor point for intra-RAT and inter-RAT mobility, an external PDU session point of interconnect to DN 1136, and a branching point to support multi-homed PDU session. The UPF 1148 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 1148 may include an uplink classifier to support routing traffic flows to a data network 1136.

The NSSF 1150 selects a set of network slice instances serving the UE 1102. The NSSF 1150 also determines allowed NSSAI and the mapping to the subscribed S-NSSAIs, if needed. The NSSF 1150 also determines an AMF set to be used to serve the UE 1102, or a list of candidate AMFs 1144 based on a suitable configuration and possibly by querying the NRF 1154. The selection of a set of network slice instances for the UE 1102 may be triggered by the AMF 1144 with which the UE 1102 is registered by interacting with the NSSF 1150; this may lead to a change of AMF 1144. The NSSF 1150 interacts with the AMF 1144 via an N22 reference point; and may communicate with another NSSF in a visited network via an N31 reference point (not shown).

The NEF 1152 securely exposes services and capabilities provided by 3GPP NFs for third party, internal exposure/re-exposure, AFs 1160, edge computing or fog computing systems (e.g., edge compute node, and the like. In such examples, the NEF 1152 may authenticate, authorize, or throttle the AFs. NEF 1152 may also translate information exchanged with the AF 1160 and information exchanged with internal network functions. For example, the NEF 1152 may translate between an AF-Service-Identifier and an internal 5GC information. NEF 1152 may also receive information from other NFs based on exposed capabilities of other NFs. This information may be stored at the NEF 1152 as structured data, or at a data storage NF using standardized interfaces. The stored information can then be re-exposed by the NEF 1152 to other NFs and AFs, or used for other purposes such as analytics.

The NRF 1154 supports service discovery functions, receives NF discovery requests from NF instances, and provides information of the discovered NF instances to the requesting NF instances. NRF 1154 also maintains information of available NF instances and their supported services. The NRF 1154 also supports service discovery functions, wherein the NRF 1154 receives NF Discovery Request from NF instance or an SCP (not shown), and provides information of the discovered NF instances to the NF instance or SCP.

The PCF 1156 provides policy rules to control plane functions to enforce them, and may also support unified policy framework to govern network behavior. The PCF 1156 may also implement a front end to access subscription information relevant for policy decisions in a UDR of the UDM 1158. In addition to communicating with functions over reference points as shown, the PCF 1156 exhibit an Npcf service-based interface.

The UDM 1158 handles subscription-related information to support the network entities' handling of communication sessions, and stores subscription data of UE 1102. For example, subscription data may be communicated via an N8 reference point between the UDM 1158 and the AMF 1144. The UDM 1158 may include two parts, an application front end and a UDR. The UDR may store subscription data and policy data for the UDM 1158 and the PCF 1156, and/or structured data for exposure and application data (including PFDs for application detection, application request information for multiple UEs 1102) for the NEF 1152. The Nudr service-based interface may be exhibited by the UDR 221 to allow the UDM 1158, PCF 1156, and NEF 1152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1158 may exhibit the Nudm service-based interface.

The EASDF 1161 exhibits an Neasdf service-based interface, and is connected to the SMF 1146 via an N88 interface. One or multiple EASDF instances may be deployed within a PLMN, and interactions between 5GC NF(s) and the EASDF 1161 take place within a PLMN. The EASDF 1161 includes one or more of the following functionalities: registering to NRF 1154 for EASDF 1161 discovery and selection; handling the DNS messages according to the instruction from the SMF 1146; and/or terminating DNS security, if used. Handling the DNS messages according to the instruction from the SMF 1146 includes one or more of the following functionalities: receiving DNS message handling rules and/or BaselineDNSPattern from the SMF 1146; exchanging DNS messages from/with the UE 1102; forwarding DNS messages to C-DNS or L-DNS for DNS query; adding EDNS client subnet (ECS) option into DNS query for an FQDN; reporting to the SMF 1146 the information related to the received DNS messages; and/or buffering/discarding DNS messages from the UE 1102 or DNS Server. The EASDF has direct user plane connectivity (e.g., without any NAT) with the PSA UPF over N6 for the transmission of DNS signaling exchanged with the UE. The deployment of a NAT between EASDF 1161 and PSA UPF 1148 may or may not be supported. Additional aspects of the EASDF 1161 are discussed in 3GPP TS 23.548.

The NSSAAF 1162 supports Network Slice-Specific Authentication and Authorization with a AAA Server (AAA-S) (see, e.g., 3GPP TS 23.502). If the AAA-S belongs to a third party, the NSSAAF may contact the AAA-S via a AAA proxy (AAA-P), and also supports access to Standalone Non-Public Network (SNPN) using credentials from Credentials Holder using AAA server (AAA-S) as specified in 3GPP TS 23.501 or using credentials from Default Credentials Server using AAA server (AAA-S) as specified in 3GPP TS 23.501. If the Credentials Holder or Default Credentials Server belongs to a third party, the NSSAAF may contact the AAA server via a AAA proxy (AAA-P). When the NSSAAF is deployed in a PLMN, the NSSAAF supports Network Slice-Specific Authentication and Authorization, while when the NSSAAF is deployed in a SNPN the NSSAAF can support Network Slice-Specific Authentication and Authorization and/or the NSSAAF can support access to SNPN using credentials from Credentials Holder. The NSSAAF 1162 deployed in the SNPN can support primary authentication in the SNPN using credentials from Credentials Holder using a AAA Server (as depicted) and/or the NSSAAF can support Network Slice-Specific Authentication and Authorization with a Network Slice-Specific AAA Server (not depicted).

AF 1160 provides application influence on traffic routing, provide access to NEF 1152, and interact with the policy framework for policy control. The AF 1160 may influence UPF 1148 (re)selection and traffic routing. Based on operator deployment, when AF 1160 is considered to be a trusted entity, the network operator may permit AF 1160 to interact directly with relevant NFs. Additionally, the AF 1160 may be used for edge computing implementations.

The 5GC 1140 may enable edge computing by selecting operator/3rd party services to be geographically close to a point that the UE 1102 is attached to the network. This may reduce latency and load on the network. In edge computing implementations, the 5GC 1140 may select a UPF 1148 close to the UE 1102 and execute traffic steering from the UPF 1148 to DN 1136 via the N6 interface. This may be based on the UE subscription data, UE location, and information provided by the AF 1160, which allows the AF 1160 to influence UPF (re)selection and traffic routing.

The data network (DN) 1136 may represent various network operator services, Internet access, or third party services that may be provided by one or more servers including, for example, application (app)/content server 1138. The DN 1136 may be an operator external public, a private PDN, or an intra-operator packet data network, for example, for provision of IMS services. In this embodiment, the app server 1138 can be coupled to an IMS via an S-CSCF or the I-CSCF. In some implementations, the DN 1136 may represent one or more local area DNs (LADNs), which are DNs 1136 (or DN names (DNNs)) that is/are accessible by a UE 1102 in one or more specific areas. Outside of these specific areas, the UE 1102 is not able to access the LADN/DN 1136.

Additionally or alternatively, the DN 1136 may be an Edge DN 1136, which is a (local) Data Network that supports the architecture for enabling edge applications. In these embodiments, the app server 1138 may represent the physical hardware systems/devices providing app server functionality and/or the application software resident in the cloud or at an edge compute node that performs server function(s). In some embodiments, the app/content server 1138 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN such as RAN 1114. For example, the edge compute nodes can provide a connection between the RAN 1114 and UPF 1148 in the 5GC 1140. The edge compute nodes can use one or more NFV instances instantiated on virtualization infrastructure within the edge compute nodes to process wireless connections to and from the RAN 1114 and UPF 1148.

The interfaces of the 5GC 1140 include reference points and service-based interfaces. The reference points include: N1 (between the UE 1102 and the AMF 1144), N2 (between RAN 1114 and AMF 1144), N3 (between RAN 1114 and UPF 1148), N4 (between the SMF 1146 and UPF 1148), N5 (between PCF 1156 and AF 1160), N6 (between UPF 1148 and DN 1136), N7 (between SMF 1146 and PCF 1156), N8 (between UDM 1158 and AMF 1144), N9 (between two UPFs 1148), N10 (between the UDM 1158 and the SMF 1146), N11 (between the AMF 1144 and the SMF 1146), N12 (between AUSF 1142 and AMF 1144), N13 (between AUSF 1142 and UDM 1158), N14 (between two AMFs 1144; not shown), N15 (between PCF 1156 and AMF 1144 in case of a non-roaming scenario, or between the PCF 1156 in a visited network and AMF 1144 in case of a roaming scenario), N16 (between two SMFs 1146; not shown), N22 (between AMF 1144 and NSSF 1150), N88 (between point between SMF 1146 and EASDF 1161), N83 (reference point between AUSF 1142 and NSSAAF 1162), N58 (reference point between AMF 1144 and the NSSAAF 1162; not shown), N59 (reference point between UDM 1158 and the NSSAAF 1162; not shown), and/or others discussed in 3GPP TS 23.501. Other reference point representations not shown in FIG. 11 can also be used. The service-based representation of FIG. 11 represents NFs within the control plane that enable other authorized NFs to access their services. The service-based interfaces (SBIs) include: Namf (SBI exhibited by AMF 1144), Nsmf (SBI exhibited by SMF 1146), Nnef (SBI exhibited by NEF 1152), Npcf (SBI exhibited by PCF 1156), Nudm (SBI exhibited by the UDM 1158), Naf (SBI exhibited by AF 1160), Nnrf (SBI exhibited by NRF 1154), Nnssf (SBI exhibited by NSSF 1150), Nausf (SBI exhibited by AUSF 1142), Neasdf (SBI exhibited by exhibited by EASDF 1161), Nnssaaf (SBI exhibited by exhibited by NSSAAF 1162), and/or others discussed in 3GPP TS 23.501. Other service-based interfaces (e.g., Nudr, N5g-eir, and Nudsf) not shown in FIG. 11 can also be used. In some embodiments, the NEF 1152 can provide an interface to edge compute nodes 1136*x*, which can be used to process wireless connections with the RAN 1114.

In some implementations, the network 1100 may include an SMSF, which is responsible for SMS subscription checking and verification, and relaying SM messages to/from the UE 1102 to/from other entities, such as an SMS-GMSC/IWMSC/SMS-router. The SMS may also interact with AMF 1144 and UDM 1158 for a notification procedure that the UE 1102 is available for SMS transfer (e.g., set a UE not reachable flag, and notifying UDM 1158 when UE 1102 is available for SMS).

As mentioned previously, the 5GS can also include an N3IWF 130, TNGF 111, W-AGF, and TWIF 121 (see, e.g., FIGS. 1B-1C). The functionality of W-AGF is specified in 3GPP TS 23.316. TWAP 120 and TNAP 110 may also be integrated in or adjacent to the 5GS.

The N3IWF 130 of FIG. 1C, in the case of untrusted non-3GPP access, includes the following: support of IPsec tunnel establishment with the UE 1102 (the N3IWF 130 terminates the IKEv2/IPsec protocols with the UE 1102 over NWu and relays over N2 the information needed to authenticate the UE 1102 and authorize its access to the 5GCN); termination of N2 and N3 interfaces to 5GC 1140 for control-plane and user-plane respectively; relaying uplink and downlink control-plane NAS (N1) signaling between the UE 1102 and AMF 1144; handling of N2 signaling from SMF 1146 (relayed by AMF 1144) related to PDU Sessions and QoS; establishment of IPsec Security Association (IPsec SA) to support PDU Session traffic; relaying uplink and downlink user-plane packets between the UE 1102 and UPF 1148, involves de-capsulation/encapsulation of packets for IPSec and N3 tunnelling; enforcing QoS corresponding to N3 packet marking, taking into account QoS requirements associated to such marking received over N2; N3 user-plane packet marking in the uplink; local mobility anchor within untrusted N3ANs using MOBIKE per IETF RFC 4555; and supporting AMF selection. The NWu is a reference point between the UE 1102 and the N3IWF 130 for establishing secure tunnel(s) between the UE 1102 and the N3IWF 130 so that control-plane and user-plane exchanged between the UE and the 5G Core Network is transferred securely over untrusted non-3GPP access.

The TNGF 111, in the case of trusted non-3GPP access, includes the following: terminates the N2 and N3 interfaces; terminates the EAP-5G signaling and behaves as authenticator when the UE 1102 attempts to register to 5GC 1140 via the TNAN; implements the AMF selection procedure; transparently relays NAS messages between the UE 1102 and the AMF 1144, via NWt; handles N2 signaling with SMF 1146 (relayed by AMF 1144) for supporting PDU sessions and QoS; transparently relays PDU data units between the UE 1102 and UPF(s) 1148; implements a local mobility anchor within the TNAN. The NWt is a reference point between the UE 1102 and the TNGF 111 (of FIG. 1B), which is used to transfer/relay NAS messages between the UE 1102 and the AMF 1144. A secure NWt connection is established over this reference point, as specified in 3GPP TS 23.502. Other aspects of non-3GPP access are discussed in 3GPP TS 23.501.

The devices that do not support 5GC NAS signaling over WLAN access are referred to as Non-5G-Capable over WLAN (NSCW) devices (e.g., N5CW device 1102' in FIG. 1B). An N5CW device is not capable to operate as a 5G UE that supports 5GC NAS signaling over a WLAN access network, however, it may be capable to operate as a 5G UE over NG-RAN. 3GPP TS 23.501 specifies the 5GC 1140 architectural enhancements that enable N5CW devices to access 5GC via trusted WLAN access networks. A trusted WLAN access network is a particular type of a Trusted Non-3GPP Access Network (TNAN) that supports a WLAN access technology. Not all trusted WLAN access networks support 5GC access from N5CW devices. To support 5GC access from NSCW devices, a trusted WLAN access network can support functionality specified herein (e.g., to support the TWIF 121). When a NSCW device performs an EAP-based access authentication procedure to connect to a trusted WLAN access network, the N5CW device may simultaneously be registered to a 5GC of a PLMN. The 5GC registration is performed by the TWIF 121 (see, e.g., 3GPP TS 23.501) in the trusted WLAN access network, on behalf of the N5CW device. The type of EAP authentication procedure, which is used during the 5GC registration to authenticate the N5CW device, is specified in 3GPP TS 33.501. The TWIF 121 is a particular type of a Trusted Non-3GPP Access Point (TNAP) specified in 3GPP TS 23.501 that supports a WLAN access technology. The TWIF 121 provides interworking functionality that enables N5CW devices to access 5GC 1140. The TWIF 121 supports the following functions: terminates the N1, N2 and N3 interfaces; implements the AMF selection procedure; implements the NAS protocol stack and exchanges NAS messages with the AMF on behalf of the N5CW device; and on the user plane, it relays protocol data units (PDUs) between the Yw interface and the N3 interface. Additionally, the TWIF 121 may implement a local mobility anchor within the trusted WLAN access network. Other aspects of the TWIF 121 may be specified in 3GPP TS 23.501.

Figure 12:
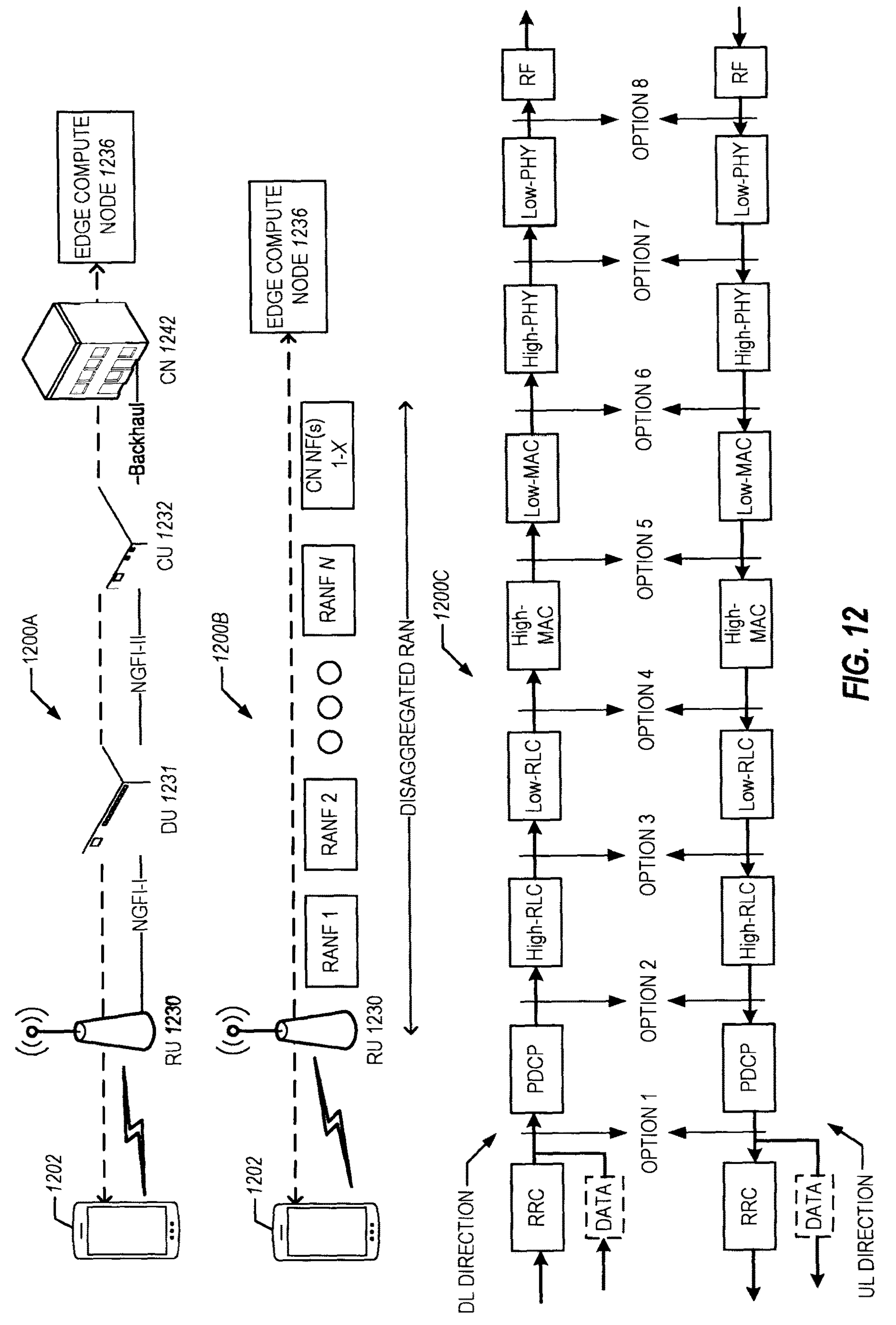
FIG. 12 depicts aspects of an RAN split architecture, according to an example.

FIG. 12 shows example network deployments including an example next generation fronthaul (NGF) deployment 1200A where a user equipment (UE) 1202 is connected to an RU 1230 (also referred to as a "remote radio unit 1230", "a remote radio head 1230", or "RRH 1230") via an air interface, the RU 1230 is connected to a Digital Unit (DU) 1231 via a NGF interface (NGFI)-I, the DU 1231 is connected to a Central Unit (CU) 1232 via an NGFI-II interface, and the CU 1232 is connected to a core network (CN) 1242 via a backhaul interface. In 3GPP NG-RAN implementations (see, e.g., 3GPP TS 38.401), the DU 1231 may be a distributed unit (for purposes of the present disclosure, the term "DU" may refer to a digital unit and/or a distributed unit unless the context dictates otherwise).

In some implementations, the NGF deployment 1200A may be arranged in a distributed RAN (D-RAN) architecture where the CU 1232, DU 1231, and RU 1230 reside at a cell site and the CN 1242 is located at a centralized site. Alternatively, the NGF deployment 1200A may be arranged in a centralized RAN (C-RAN) architecture with centralized processing of one or more baseband units (BBUs) at the centralized site. In C-RAN architectures, the radio components are split into discrete components, which can be located in different locations. In one example C-RAN implementation, only the RU 1230 is disposed at the cell site, and the DU 1231, the CU 1232, and the CN 1242 are centralized or disposed at a central location. In another example C-RAN implementation, the RU 1230 and the DU 1231 are located at the cell site, and the CU 1232 and the CN 1242 are at the centralized site. In another example C-RAN implementation, only the RU 1230 is disposed at the cell site, the DU 1231 and the CU 1232 are located a RAN hub site, and the CN 1242 is at the centralized site.

The CU 1232 is a central controller that can serve or otherwise connect to one or multiple DUs 1231 and/or multiple RUs 1230. The CU 1232 is network (logical) nodes hosting higher/upper layers of a network protocol functional split. For example, in the 3GPP NG-RAN and/or O-RAN architectures, a CU 1232 hosts the radio resource control (RRC) (see, e.g., 3GPP TS 36.331 and/or 3GPP TS 38.331), Service Data Adaptation Protocol (SDAP) (see, e.g., 3GPP TS 37.324), and Packet Data Convergence Protocol (PDCP) (see, e.g., 3GPP TS 36.323 and/or 3GPP TS 38.323) layers of a next generation NodeB (gNB), or hosts the RRC and PDCP protocol layers when included in or operating as an E-UTRA-NR gNB (en-gNB). The SDAP sublayer performs mapping between QoS flows and a data radio bearers (DRBs) and marking QoS flow IDs (QFI) in both DL and UL packets. The PDCP sublayer performs transfers user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery. In various implementations, a CU 1232 terminates respective F1 interfaces connected with corresponding DUs 1231 (see, e.g., 3GPP TS 38.401).

A CU 1232 may include a CU-control plane (CP) entity (referred to herein as "CU-CP 1232") and a CU-user plane (UP) entity (referred to herein as "CU-UP 1232"). The CU-CP 1232 is a logical node hosting the RRC layer and the control plane part of the PDCP protocol layer of the CU 1232 (e.g., a gNB-CU for an en-gNB or a gNB). The CU-CP 1232 terminates an E1 interface connected with the CU-UP 1232 and the F1-C interface connected with a DU 1231. The CU-UP 1232 is a logical node hosting the user plane part of the PDCP protocol layer (e.g., for a gNB-CU 1232 of an en-gNB), and the user plane part of the PDCP protocol layer and the SDAP protocol layer (e.g., for the gNB-CU 1232 of a gNB). The CU-UP 1232 terminates the E1 interface connected with the CU-CP 1232 and the F1-U interface connected with a DU 1231.

The DU 1231 controls radio resources, such as time and frequency bands, locally in real time, and allocates resources to one or more UEs. The DUs 1231 are network (logical) nodes hosting middle and/or lower layers of the network protocol functional split. For example, in the 3GPP NG-RAN and/or O-RAN architectures, a DU 1231 hosts the radio link control (RLC) (see, e.g., 3GPP TS 38.322 and 3GPP TS 36.322), medium access control (MAC) (see, e.g., 3GPP TS 38.321 and 3GPP TS 36.321), and high-physical (PHY) (see, e.g., 3GPP TS 38.201 and 3GPP TS 36.201) layers of the gNB or en-gNB, and its operation is at least partly controlled by the CU 1232. The RLC sublayer operates in one or more of a Transparent Mode (TM), Unacknowledged Mode (UM), and Acknowledged Mode (AM). The RLC sublayer performs transfer of upper layer PDUs; sequence numbering independent of the one in PDCP (UM and AM); error Correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; and/or protocol error detection (AM only). The MAC sublayer performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding. In some implementations, a DU 1231 can host a Backhaul Adaptation Protocol (BAP) layer (see, e.g., 3GPP TS 38.340) and/or a F1 application protocol (F1 AP) (see, e.g., 3GPP TS 38.470), such as when the DU 1231 is operating as an Integrated Access and Backhaul (IAB) node. One DU 1231 supports one or multiple cells, and one cell is supported by only one DU 1231. A DU 1231 terminates the F1 interface connected with a CU 1232. Additionally or alternatively, the DU 1231 may be connected to one or more RRHs/RUs 1230.

The RU 1230 is a transmission/reception point (TRP) or other physical node that handles radiofrequency (RF) processing functions. The RU 1230 is a network (logical) node hosting lower layers based on a lower layer functional split. For example, in 3GPP NG-RAN and/or O-RAN architectures, the RU 1230 hosts low-PHY layer functions and RF processing of the radio interface based on a lower layer functional split. The RU 1230 may be similar to 3GPP's transmission/reception point (TRP) or RRH, but specifically includes the Low-PHY layer. Examples of the low-PHY functions include fast Fourier transform (FFT), inverse FFT (iFFT), physical random access channel (PRACH) extraction, and the like.

The CUs 1232, DUs 1231, and RUs 1230 are connected through respective links, which may be any suitable wireless and/or wired (e.g., fiber, copper, and the like) links. Additional aspects of CUs 1232, DUs 1231, and RUs 1230 are discussed in O-RAN Alliance Specifications, 3GPP TS 38.401, 3GPP TS 38.410, and 3GPP TS 38.300.

In some implementations, a fronthaul gateway function (FHGW) may be disposed between the DU 1231 and the RU/RRU 1230 (not shown by FIG. 12), where the interface between the DU 1231 and the FHGW is an Open Fronthaul (e.g., Option 7-2x) interface, the interface between FHGW function and the RU/RRU 1230 is an Open Fronthaul (e.g., Option 7-2x) interface or any other suitable interface (e.g., option 7, option 8, or the like) including those that do not support Open Fronthaul (e.g., Option 7-2x). The FHGW may be packaged with one or more other functions (e.g., Ethernet switching and/or the like) in a physical device or appliance. In some implementations, a RAN controller may be communicatively coupled with the CU 1232 and/or the DU 1231.

NGFI (also referred to as "xHaul" or the like) is a two-level fronthaul architecture that separates the traditional RRU 1230 to BBU connectivity in the C-RAN architecture into two levels, namely levels I and II. Level I connects the RU 1230 via the NGFI-I interface to the DU 1231, and level II connects the DU 1231 via the NGFI-II interface to the CU 1232 as shown by deployment 1200A in FIG. 12. The NGFI-I and NGFI-II connections may be wired connections or wireless connections, which may utilize any suitable RAT such as any of those discussed herein. The purpose of the two-level architecture is to distribute (split) the RAN node protocol functions between CU 1232 and DU 1231 such that latencies are relaxed, giving more deployment flexibilities. In general, the NGFI-I interfaces with the lower layers of the function split which have stringent delay and data rate requirements, whereas NGFI-II interfaces with higher layers of the function split relative to the layers of the NGFI-I, relaxing the requirements for the fronthaul link. Examples of the NGFI fronthaul interfaces and functional split architectures include O-RAN fronthaul, Enhanced Common Radio Interface (CPRI) based C-RAN fronthaul, Radio over Ethernet (RoE) based C-RAN fronthaul (see, e.g., IEEE Standard for Radio over Ethernet Encapsulations and Mappings, IEEE Standards Association, IEEE 1914.3-2018 (5 Oct. 2018)), and/or the like. Additional aspects of NGFI are also discussed in other O-RAN Alliance specifications, IEEE Standard for Packet-based Fronthaul Transport Networks, IEEE Standards Association, IEEE 1914.1-2019 (21 Apr. 2020), and Nasrallah et al., Ultra-Low Latency (ULL) Networks: A Comprehensive Survey Covering the IEEE TSN Standard and Related ULL Research, arXiv: 1803.07673v1 [cs.NI] (20 Mar. 2018).

In one example, the deployment 1200A may implement a low level split (LLS) (also referred to as a "Lower Layer Functional Split 7-2x" or "Split Option 7-2x") that runs between the RU 1230 (e.g., an O-RU in O-RAN architectures) and the DU 1231 (e.g., an O-DU in O-RAN architectures). In this example implementation, the NGFI-I is the Open Fronthaul interface described in the O-RAN Open Fronthaul Specification. Other LLS options may be used such as the relevant interfaces described in other standards or specifications such as, for example, the 3GPP NG-RAN functional split (see, e.g., 3GPP TS 38.401 and 3GPP TR 38.801), the Small Cell Forum for Split Option 6 (see, e.g., 5G small cell architecture and product definitions: Configurations and Specifications for companies deploying small cells 2020-2025, Small Cell Forum, document 238.10.01 (5 Jul. 2020), 5G NR FR1 Reference Design: The case for a common, modular architecture for 5G NR FR1 small cell distributed radio units, Small Cell Forum, document 251.10.01 (15 Dec. 2021), and O-RAN Alliance specification documents).

Additionally or alternatively, the CUs 1232, DUs 1231, and/or RUs 1230 may be IAB nodes. IAB enables wireless relaying in an NG-RAN where a relaying node (referred to as an "IAB-node") supports access and backhauling via 3GPP 5G/new radio (NR) links/interfaces. The terminating node of NR backhauling on the network side is referred to as an "IAB-donor", which represents a RAN node (e.g., a gNB) with additional functionality to support IAB. Backhauling can occur via a single or via multiple hops. All IAB-nodes that are connected to an IAB-donor via one or multiple hops form a directed acyclic graph (DAG) topology with the IAB-donor as its root. The IAB-donor performs centralized resource, topology and route management for the IAB topology.

Although the NGF deployment 1200A shows the CU 1232, DU 1231, RRH 1230, and CN 1242 as separate entities, in other implementations some or all of these network nodes can be bundled, combined, or otherwise integrated with one another into a single device or element, including collapsing some internal interfaces (e.g., F1-C, F1-U, E1, E2, and the like). At least the following implementations are possible: (i) integrating the CU 1232 and the DU 1231 (e.g., a CU-DU), which is connected to the RRH 1230 via the NGFI-I; (ii) integrating the DU 1231 and the RRH 1230 integrated (e.g., CU-DU), which is connected to the CU 1232 via NGFI-II; (iii) integrating a RAN controller and the CU 1232, which is connected to the DU 1231 via NGFI-II; (iv) integrating the CU 1232, the DU 1231, and the RU 1230, which is connected to the CN 1242 via backhaul interface; and (v) integrating the network controller (or intelligent controller), the CU 1232, the DU 1231, and the RU 1230. Any of the aforementioned example implementations involving the CU 1232 may also include integrating the CU-CP 1232 and CP-UP 1232.

FIG. 12 also shows an example RAN disaggregation deployment 1200B (also referred to as "disaggregated RAN 1200B") where the UE 1202 is connected to the RRH 1230, and the RRH 1230 is communicatively coupled with one or more of the RAN functions (RANFs) 1-N (where N is a whole number). The RANFs 1-N are disaggregated and distributed geographically across several component segments and network nodes. In some implementations, each RANF 1-N is a software (SW) element operated by a physical compute node and the RRH 1230 includes radiofrequency (RF) circuitry (e.g., an RF propagation module for a particular RAT and/or the like). In this example, the RANF 1 is operated on a physical compute node that is co-located with the RRH 1230 and the other RANFs are disposed at locations further away from the RRH 1230. Additionally in this example, the CN 1242 is also disaggregated into CN NFs 1-x (where x is a number) in a same or similar manner as the RANFs 1-N, although in other implementations the CN 1242 is not disaggregated.

Network disaggregation (or disaggregated networking) involves the separation of networking equipment into functional components and allowing components to be individually deployed. This may encompass separation of SW elements (e.g., NFs) from specific HW elements and/or using APIs to enable software defined network (SDN) and/or and NF virtualization (NFV). RAN disaggregation involves network disaggregation and virtualization of various RANFs (e.g., RANFs 1-N in FIG. 12). The RANFs 1-N can be placed in different physical sites in various topologies in a RAN deployment based on the use case. This enables RANF distribution and deployment over different geographic areas and allows a breakout of RANFs to support various use cases (e.g., low latency use cases and the like) as well as flexible RAN implementations. Disaggregation offers a common or uniform RAN platform capable of assuming a distinct profile depending on where it is deployed. This allows fewer fixed-function devices, and a lower total cost of ownership, in comparison with existing RAN architectures. Example RAN disaggregation frameworks are provided by Telecom Infra Project (TIP) OpenRAN™, Cisco® Open vRAN™, O-RAN Alliance specifications, Open Optical & Packet Transport (OOPT), Reconfigurable Optical Add Drop Multiplexer (ROADM), and/or the like.

In a first example implementation, the RANFs 1-N disaggregate RAN HW and SW with commercial off-the-shelf (COTS) HW and open interfaces (e.g., NGFI-I and NGFI-II, and the like). In this example implementation, each RANF 1-N may be a virtual BBU or vRAN controller operating on COTS compute infrastructure with HW acceleration for BBU/vRANFs.

In a second example implementation, the RANFs 1-N disaggregate layers of one or more RAT protocol stacks. As an example of this implementation, RANF 1 is a DU 1231 operating on first COTS compute infrastructure with HW acceleration for BBU/vRANFs, and RANF 2 is a virtual CU 1232 operating on second COTS compute infrastructure.

In a third example implementation, the RANFs 1-N disaggregate control plane and user plane functions. As an example of this implementation, the RANF 1 is a DU 1231 operating on COTS compute infrastructure with HW acceleration for BBU/vRANFs, RANF 2 is a virtual CU-CP 1232 operating on COTS compute infrastructure, and a third RANF (e.g., RANF 3 (not shown by FIG. 12)) is a virtual CU-UP 1232 operating on the same or different COTS compute infrastructure as the virtual CU-CP 1232. Additionally or alternatively, in this implementation, one or more CN NFs 1-x may be CN-UP functions and one or more other CN NFs 1-x may be CN-CP functions.

In a fourth example implementation, the RANFs 1-N disaggregate layers of an IEEE 802.11 RAT. As an example of this implementation, the RRH 1230 implements a Wi-Fi PHY layer, RANF 1 implements a Wi-Fi MAC sublayer, RANF 1 implements a Wi-Fi logical link control (LLC) sublayer, RANF 2 implements one or more Wi-Fi upper layer protocols (e.g., network layer, transport layer, session layer, presentation layer, and/or application layer), and so forth.

In a fifth example implementation, the RANFs 1-N disaggregate different O-RAN RANFs including E2SMs. As an example of this implementation, RANF 1 implements the near-RT RIC, RANF 2 implements the E2SM-KPM, RANF 3 implements the E2SM-CCC, RANF 4 implements the E2SM RAN control, RANF 5 implements the E2SM-NI, RANF 6 implements functions for providing A1 services, and so forth.

In any of the implementations discussed herein, the lower layers of the RAN protocol stack can be characterized by real-time (RT) functions and relatively complex signal processing algorithms, and the higher layers of the RAN protocol stack can be characterized by non-RT functions. In these implementations, the RT functions and signal processing algorithms can be implemented in DUs 1231 and/or RRHs 1230 either using purpose-built network elements or in COTS hardware augmented with purpose-built hardware accelerators. As used herein, such hardware accelerators may be provided by any of a SoC, chiplet, ASIC, FPGA, GPU, IPU/DPU, including being embodied by an on-package or on-die circuitry component, or by an off-die or off-package component such as an add-in card or component connected by an interconnect (e.g., via an PCIe or CXL interconnect, etc.). In this context, the hardware accelerator may perform any number of specialized actions or functions such as data transformation, compression, cryptography, computation, matching, classification, inference, regression, or the like.

FIG. 12 also shows various functional split options 1200C, for both DL and UL directions. The traditional RAN is an integrated network architecture based on a distributed RAN (D-RAN) model, where D-RAN integrates all RANFs into a few network elements. As alluded to previously, the disaggregated RAN architecture provides flexible function split options to overcome various drawbacks of the D-RAN model. The disaggregated RAN breaks up the integrated network system into several function components that can then be individually re-located as needed without hindering their ability to work together to provide a holistic network services. The split options 1200C are mostly split between the CU 1232 and the DU 1231, but can include a split between the CU 1232, DU 1231, and RU 1230. For each option 1200C, protocol entities on the left side of the figure are included in the RANF implementing the CU 1232 and the protocol entities on the right side of the figure are included in the RANF implementing the DU 1231. For example, the Option 2 function split includes splitting non-RT processing (e.g., RRC and PDCP layers) from RT processing (e.g., RLC, MAC, and PHY layers), where the RANF implementing the CU 1232 performs network functions of the RRC and PDCP layers, and the RANF implementing the DU 1231 performs the baseband processing functions of the RLC (including high-RLC and low-RLC), MAC (including high-MAC and low-MAC), and PHY layers. In some implementations, the PHY layer is further split between the DU 1231 and the RU 1230, where the RANF implementing the DU 1231 performs the high-PHY layer functions and the RU 1230 handles the low-PHY layer functions. In some implementations, the Low-PHY entity may be operated by the RU 1230 regardless of the selected functional split option. Under the Option 2 split, the RANF implementing the CU 1232 can connect to multiple DU 1231 (e.g., the CU 1232 is centralized), which allows RRC and PDCP anchor change to be eliminated during a handover across DUs 1231 and allows the centralized CU 1232 to pool resources across several DUs 1231. In these ways, the option 2 function split can improve resource efficiencies. The particular function split option used may vary depending on the service requirements and network deployment scenarios, and may be implementation specific. It should also be noted that in some implementations, all of the function split options can be selected where a protocol stack entity is operated by a respective RANF (e.g., a first RANF operates the RRC layer, a second RANF operates the PDCP layer, a third RANF operates the high-RLC layer, and so forth until an eighth RANF operates the low-PHY layer).

Figure 13:
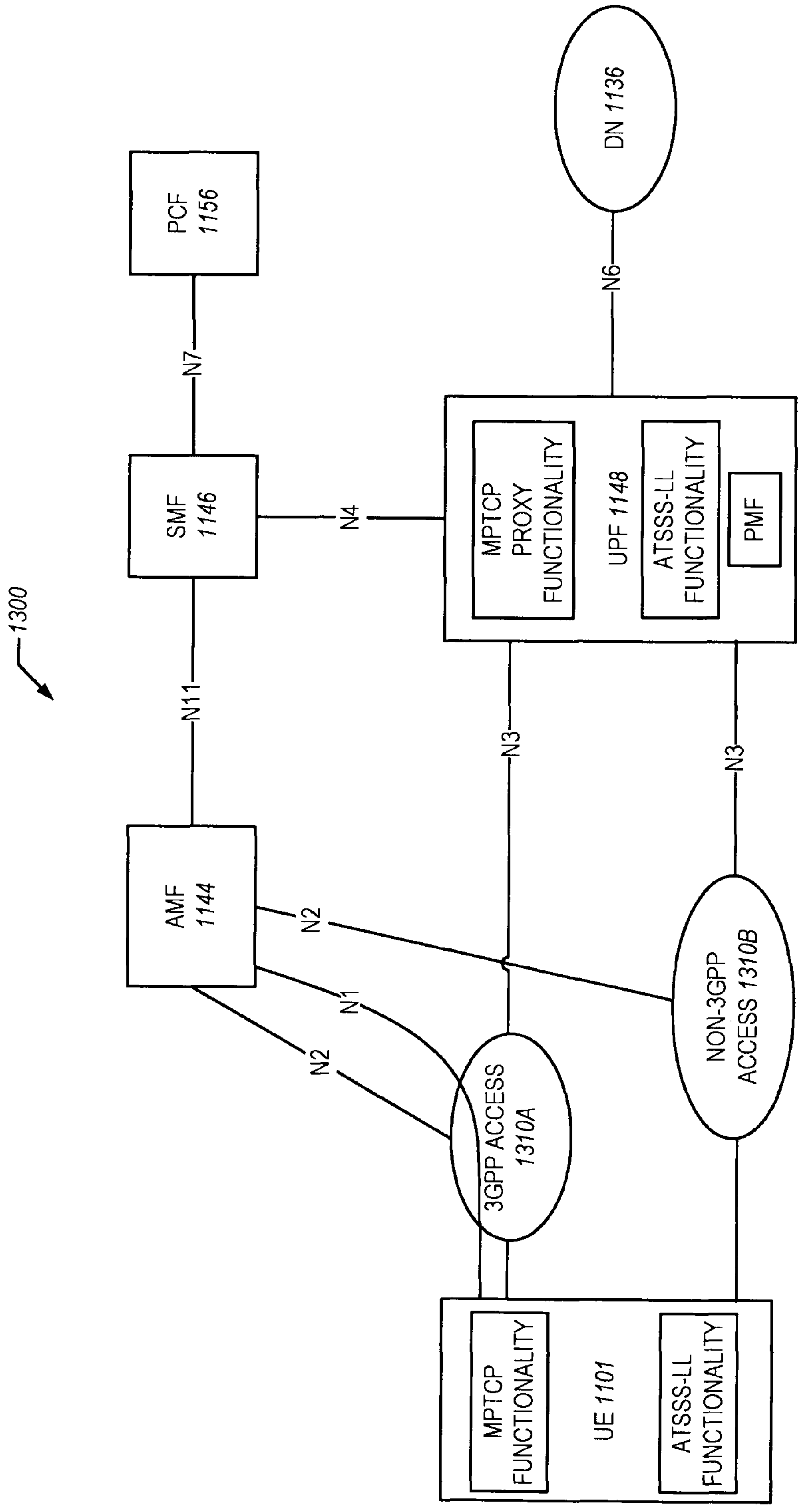
FIG. 13 depicts an example Fifth Generation System (5GS) architecture with Access Traffic Steering, Switching, Splitting (ATSSS) support, according to an example.

FIG. 13 shows an example Fifth Generation System (5GS) architecture 1300 extended to support Access Traffic Steering, Switching, Splitting (ATSSS). The ATSSS feature is an optional feature that may be supported by the UE and the 5GC network. The ATSSS feature enables a multi-access PDU Connectivity Service, which can exchange PDUs between the UE 1101 and a DN 1136 by simultaneously using one 3GPP AN 1310A and one non-3GPP AN 1310B. The multi-access PDU Connectivity Service is realized by establishing a Multi-Access PDU (MA PDU) Session (e.g., a PDU Session that may have UP resources on two access networks). The functionality in the UE 1101 that can steer, switch and split the MA PDU Session traffic across 3GPP access 1310A and non-3GPP access 1310B, is called a "steering functionality".

In this example, the UE 1101 supports one or more of the steering functionalities, namely the MPTCP functionality and/or ATSSS lower level (ATSSS-LL) functionality. The steering functionality in the UE 1101 enables traffic steering, switching and splitting across 3GPP access 1310A and non-3GPP access 1310B, in accordance with the ATSSS rules provided by the network.

The UPF 1148 supports MPTCP Proxy functionality, which communicates with the MPTCP functionality in the UE 1101 by using the MPTCP protocol. The UPF 1148 supports ATSSS-LL functionality, which is similar to the ATSSS-LL functionality defined for the UE 1101. There may not be a protocol defined between the ATSSS-LL functionality in the UE 1101 and the ATSSS-LL functionality in the UPF 1148. In addition, the UPF 1148 supports Performance Measurement Functionality (PMF), which may be used by the UE 1101 to obtain access performance measurements (see, e.g., 3GPP TS 23.501) over the UP of 3GPP access 1310A and/or over the UP of non-3GPP access 1310B. A UPF 1148 that supports the MPTCP Proxy functionality and the PMF can be connected via an N9 reference point instead of the N3 reference point (see, e.g., FIG. 11).

The UE 1101 requests an MA PDU Session when the UE 1101 is registered via both 3GPP and non-3GPP accesses 1310A-B, or when the UE 1101 is registered via one access only. After the establishment of a MA PDU Session, and when there are UP resources on both access networks, the UE 1101 applies network-provided policy (e.g., ATSSS rules) and considers local conditions (e.g., network interface availability, signal loss conditions, user preferences, etc.) for deciding how to distribute the uplink traffic across the two access networks. Similarly, the UPF 1148 anchor of the MA PDU Session applies network-provided policy (e.g., N4 rules) and feedback information received from the UE via the UP (e.g., signal loss conditions, access network Unavailability or Availability, etc.) for deciding how to distribute the downlink traffic across the two N3/N9 tunnels and the two access networks 1310A-B. When there are UP resources on only one access network 1310, the UE 1101 applies the ATSSS rules 1425 and considers local conditions for triggering the establishment or activation of the UP resources over another access 1310.

The type of a MA PDU Session may be one of the following types: IPv4, IPv6, IPv4v6, and Ethernet. 3GPP TS 23.501 may define what Steering Functionalities can be used for each supported type of a MA PDU Session. The ATSSS feature can be supported over any type of access network, including untrusted and trusted N3ANs, wireline 5G access networks, etc., as long as a MA PDU Session can be established over this type of access network 1310.

The AMF 1144, SMF 1146, and PCF 322 are discussed in more detail herein with respect to FIG. 11, and are extended with ATSSS-relevant functionality that is further discussed in 3GPP TS 23.501. For example, an MA PDU Session is managed by the SMF 1146, and the UE 1101, AMF 1144, and SMF 1146 may follow the procedures discussed in 3GPP TS 23.501 when the UE 1101 wants to request a new MA PDU Session. The AMF 1144 informs the SMF 1146 that the UE 1101 is registered over both accesses and this triggers the establishment of UP resources on both accesses. The AMF 1144 also informs the SMF 1146 when an access type becomes unavailable for an established MA PDU Session, and the SMF 1146 subsequently notifies the UPF 1148 that the access type has become unavailable. Additionally, during the establishment of a MA PDU session, the PCF 1156 may take ATSSS policy decisions and create PCC rules that contain ATSSS policy control information, which determines how the uplink and the downlink traffic of the MA PDU Session should be distributed across the 3GPP and non-3GPP accesses 1310 (see, e.g., 3GPP TS 23.501 and 3GPP TS 23.503). The interactions between the UE 1101 and PCF 1156 that may be required for ATSSS control may be specified in 3GPP TS 23.503.

When an MA PDU Session is established, the network may provide the UE 1101 with Measurement Assistance Information (MAI). The MAI assists the UE 1101 in determining which measurements should be performed over both accesses 1310, as well as whether measurement reports need to be sent to the network. MAI includes the addressing information of a PMF in the UPF 1148, and the UE 1101 can send PMF protocol messages to the PMF. For a PDU Session of IP type, the MAI contains one IP address for the PMF, one UDP port associated with 3GPP access 1310A and another UDP port associated with non-3GPP access 1310B. For a PDU Session of Ethernet type, the MAI contains one MAC address associated with 3GPP access 1310A and another MAC address associated with non-3GPP access 1310B. To protect the PMF in the UPF 1148 (e.g., to block DDOS to the PMF), the IP addresses of the PMF are only accessible from the UE 1101 IP address via the N3/N9 interface. After the MA PDU Session is released, the same UE 1101 IP address/prefix is not allocated to another UE 1101 for MA PDU Session in a short time.

The addressing information of the PMF in the UPF 1148 is retrieved by the SMF 1146 from the UPF 1148 during N4 session establishment. The following PMF protocol messages can be exchanged between the UE 1101 and the PMF: messages to allow for Round Trip Time (RTT) measurements (e.g., when the "Smallest Delay" steering mode is used); and messages for reporting Access availability/unavailability by the UE 1101 to the UPF 1148.

The PMF protocol is specified in 3GPP TS 24.193. The PMF protocol messages exchanged between the UE 1101 to the UPF 1148 use the QoS Flow associated with default QoS rule over the available access(es). The QoS Flow associated with default QoS rule for MA PDU Session is Non-GBR QoS Flow. The UE 1101 does not apply the ATSSS rules 1425 and the UPF 1148 does not apply the Multi-Access Rules (MAR) for the PMF protocol messages.

When the UE requests a MA PDU session and indicates it is capable to support the MPTCP functionality with any steering mode and the ATSSS-LL functionality with only the Active-Standby steering mode (as specified in 3GPP TS 23.501, the network may send MAI for the UE 1101 to send Access availability/unavailability reports to the UPF 1148. In this case, the UE 1101 and the UPF 1148 do not perform RTT measurements using PMF as the UE 1101 and the UPF 1148 can use measurements available at the MPTCP layer.

Figure 14:
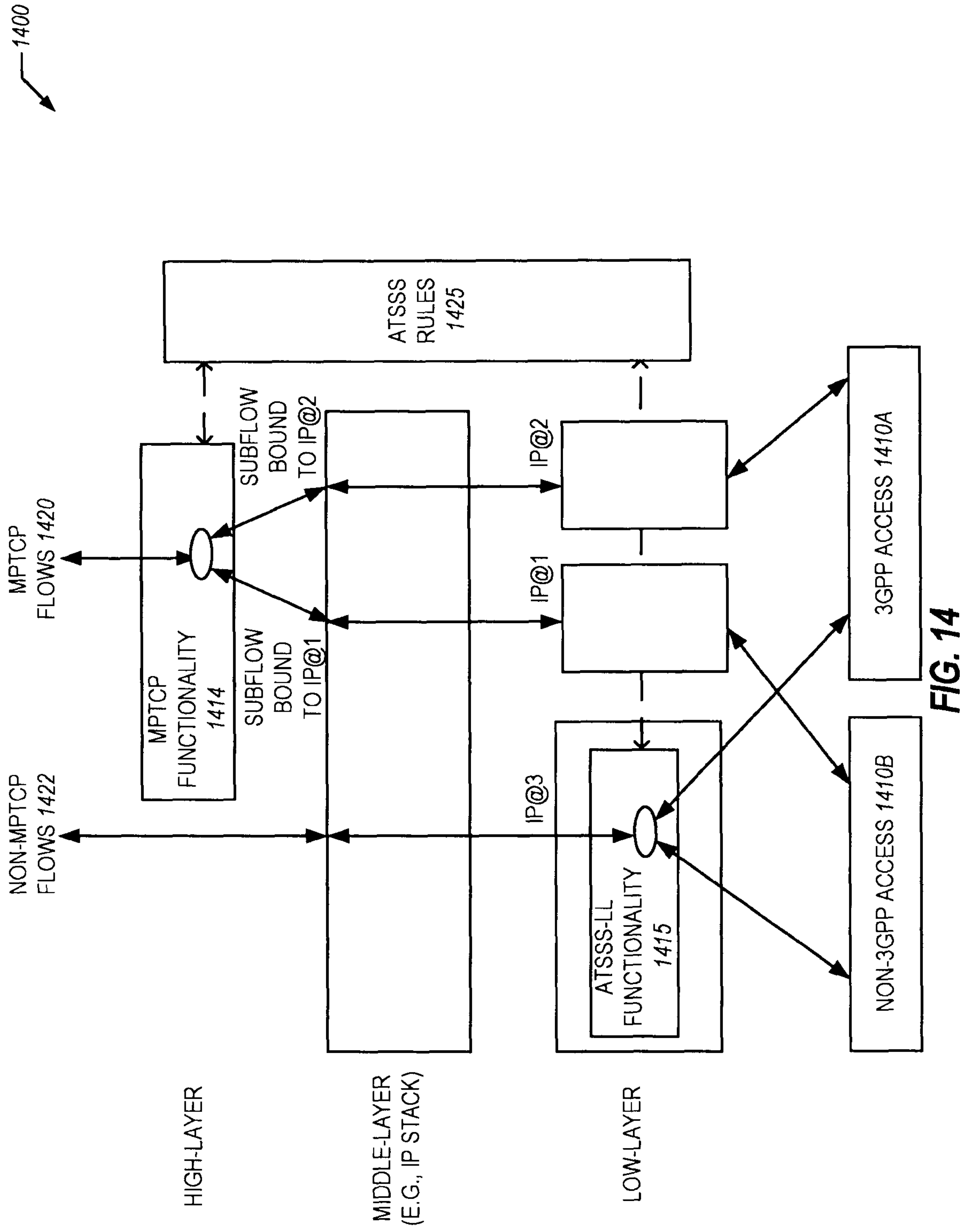
FIG. 14 depicts various steering functionalities, according to an example.

FIG. 14 schematically illustrates steering functionalities framework 1400 (also referred to as "ATSSS functionality 1400," "ATSSS mechanism 1400," "ATSSS 1400," or the like) according to various embodiments. ATSSS refers to Access Traffic Steering, Switching, Splitting. Access Traffic Steering is a procedure for selecting an access network for a new data flow and transferring the traffic of this data flow over the selected access network. Access Traffic Switching is a procedure that moves all traffic of an ongoing data flow from one access network to another access network in a way that maintains the (service) continuity of the data flow. Access Traffic Splitting is a procedure that splits the traffic of a data flow across multiple access networks. When traffic splitting is applied to a data flow, some traffic of the data flow is transferred via one access (or access network connection) and some other traffic of the same data flow is transferred via one or more other accesses (or one or more other access network connections). In 3GPP, access traffic steering, switching, and splitting is applicable between one 3GPP access 1410A and one non-3GPP access 1410B. The steering functionalities framework 1400 may be implemented by an ATSSS-capable UE 1101 and/or an ATSSS-capable UPF 1148. The steering functionalities 1400 may support one or more of "high-layer steering functionalities" that operate above the IP layer and/or "low-layer steering functionalities" that operate below the IP layer (e.g., different network interfaces in the UE 1101).

In this example, only one high-layer steering functionality is depicted, namely the MPTCP functionality 1414 (see, e.g., 3GPP TS 23.501. The MPTCP functionality 1414 can be applied to steer, switch and split MPTCP traffic flows 1420, which includes the TCP traffic of applications allowed and/or capable of using MPTCP. The MPTCP functionality 1414 in the UE 1101 may communicate with an associated MPTCP Proxy functionality in the UPF 1148, by using the MPTCP protocol over the 3GPP and/or the non-3GPP UP. Additionally, only one type of low-layer steering functionality is depicted, namely the ATSSS-LL functionality 1415 (see, e.g., 3GPP TS 23.501. This steering functionality can be applied to steer, switch and split non-MPTCP flows 1422, which may include all types of traffic such as TCP traffic, UDP traffic, Ethernet traffic, etc. Steering functionality similar to the ATSSS-LL functionality 1415 is also supported in the UPF 1148.

The MPTCP flows 1420 in FIG. 14 represent the traffic of the applications for which MPTCP can be applied. Within the same MA PDU Session in the UE 1101, it is possible to steer the MPTCP flows 1420 by using the MPTCP functionality 1414, and simultaneously, to steer all other flows 1422 by using the ATSSS-LL functionality 1415. For the same packet flow, only one steering functionality may be used in some embodiments.

All steering functionalities in the UE 1101 take ATSSS decisions (e.g., decide how to steer, switch and split the traffic) by using the same set of ATSSS rules 1425 (see, e.g., 3GPP TS 23.501). Similarly, all ATSSS decisions in the UPF 1148 are taken by applying the same set of N4 rules, which support ATSSS. The ATSSS rules 1425 and the N4 rules supporting ATSSS are provisioned in the UE 1101 and in the UPF 1148, respectively, when the MA PDU Session is established. If the UE 1101 supports both the MPTCP functionality 1414 and the ATSSS-LL functionality 1415, the UE 1101 uses the provisioned ATSSS rules 1425 (see, e.g., 3GPP TS 23.503) to decide, which functionality to apply for taking ATSSS decisions for a specific packet flow.

Additionally, in FIG. 14, if the MPTCP functionality 1414 is used (e.g., the "Layer 4 approach"), the MA PDU session contains IP traffics of two interfaces over 3GPP access 1310A and Non-3GPP access 1310B with two corresponding IP addresses (e.g., IP@1 and IP@2). If the ATSSS-LL functionality 1415 is used (e.g., the "Layer 3 approach"), the MA PDU session contains IP traffic of two interfaces over 3GPP access 1310A and Non-3GPP access 1310B with one common IP address (e.g., IP@3). Other ATSSS aspects are discussed in 3GPP TS 23.501.

The MPTCP functionality 1414 in the UE 1101 may communicate with the MPTCP Proxy functionality in the UPF 1148 using the UP of the 3GPP access 1310A, the non-3GPP access 1310B, or both. The MPTCP functionality 1414 is enabled in the UE 1101 when the UE 1101 requests an MA PDU Session and it provides an "MPTCP capability" in the MA PDU Session Establishment Request message. If the UE 1101 indicates it is capable of supporting the MPTCP functionality, and the network (e.g., 5GS) agrees to enable the MPTCP functionality for the MA PDU Session then, the associated MPTCP Proxy functionality is enabled in the UPF 1148 for the MA PDU Session.

If the UE 1101 indicates it is capable of supporting the MPTCP functionality, and the network (e.g., 5GS) agrees to enable the MPTCP functionality for the MA PDU Session then the network allocates to UE 1101 one IP address/prefix for the MA PDU Session and two additional IP addresses/prefixes, called "link-specific multipath" addresses/prefixes; one associated with 3GPP access 1310A and another associated with the non-3GPP access 1310B. In the UE 1101, these two IP addresses/prefixes are used only by the MPTCP functionality 1414. The "link-specific multipath" address/prefix assigned to UE 1101 may not be routable via N6. The MPTCP functionality 1414 in the UE 1101 and the MPTCP Proxy functionality 1414 in the UPF 1148 use the "link-specific multipath" addresses/prefixes for subflows over non-3GPP access 1310B and over 3GPP access 1310A and MPTCP Proxy functionality 1414 in the UPF 1148 uses the IP address/prefix of the MA PDU session for the communication with the final destination. In FIG. 14, the IP@3 corresponds to the IP address of the MA PDU Session and the IP@1 and IP@2 correspond to the "link-specific multipath" IP addresses. The following UE IP address management applies: the MA PDU IP address/prefix are provided to the UE 1101 via mechanisms defined in 3GPP TS 23.501; and The "link-specific multipath" IP addresses/prefixes are allocated by the UPF 1148 and are provided to the UE 1101 via SM NAS signaling.

Additionally, the network sends MPTCP proxy information to the UE 1101 (e.g., the IP address(es)), a port number and the type of the MPTCP proxy). The following types of MPTCP proxy functionality 1414 may be supported: Type 1: Transport Converter defined in Bonaventure et al., O-RTT TCP Convert Protocol, RFC 8803 (July 2020) ("[RFC8803] "). The UE should also support the client extensions specified in [RFC8803]. The MPTCP proxy information is retrieved by the SMF 1146 from the UPF 1148 during N4 session establishment.

Additionally, the network may indicate to UE 1101 the list of applications for which the MPTCP functionality 1414 should be applied. This is achieved by using the Steering Function component of an ATSSS rule (see, e.g., 3GPP TS 23.501 and/or 3GPP TS 23.503).

Additionally, when the UE 1101 indicates it is capable of supporting the MPTCP functionality 1414 with any steering mode and the ATSSS-LL functionality 1415 with only the Active-Standby steering mode (e.g., as specified in 3GPP TS 23.501) and these functionalities are enabled for the MA PDU Session, then the UE 1101 routes via the MA PDU Session the TCP traffic of applications for which the MPTCP functionality 1414 should be applied (e.g., the MPTCP traffic flows 1420), as discussed previously. The UE 1101 may route all other traffic 1422 (e.g., the non-MPTCP traffic) via the MA PDU Session, but this type of traffic may be routed on one of 3GPP access 1310A or non-3GPP access 1310B based on the received ATSSS rule 1425 for non-MPTCP traffic flows 1422 (see 3GPP TS 23.501). The UPF 1148 routes all other traffic 1422 (e.g., the non-MPTCP traffic) based on the N4 rules provided by the SMF 1146. This may include N4 rules for ATSSS-LL 1415, using any steering mode as instructed by the N4 rules.

The ATSSS-LL functionality 1415 in the UE 1101 does not apply a specific protocol. It is a data switching function, which decides how to steer, switch and split the uplink traffic across 3GPP and non-3GPP accesses 1310A-B based on the provisioned ATSSS rules 1425 and local conditions (e.g. signal loss conditions, etc.). The ATSSS-LL functionality 1415 in the UE 30 may be applied to steer, switch and split all types of traffic, including TCP traffic, UDP traffic, Ethernet traffic, etc. The ATSSS-LL functionality 1415 may be enabled in the UE 1101 when the UE 1101 provides an "ATSSS-LL capability" during the PDU Session Establishment procedure.

The ATSSS-LL functionality 1415 is mandatory in the UE 1101 for MA PDU Session of type Ethernet. When the UE 1101 does not support the MPTCP functionality 1414, the ATSSS-LL functionality 1415 is mandatory in the UE 1101 for an MA PDU Session of type IP. When the UE 1101 supports the MPTCP functionality 1414, the ATSSS-LL functionality 1415 with Active-Standby Steering Mode is mandatory in the UE 1101 for an MA PDU Session of type IP to support non-MPTCP traffic.

The network (e.g., UPF 1148) also supports the ATSSS-LL functionality 1415 as defined for the UE 1101. The ATSSS-LL functionality 1415 in the UPF 1148 is enabled for an MA PDU Session by the ATSSS-LL functionality 1415 indication received in the Multi-Access Rules (MAR) and/or when the UE 1101 provides an "ATSSS-LL capability" in the MA PDU Session Establishment Request message.

Example Edge Computing Architectures

Although the previous discussion was provided with reference to specific 5G networked hardware and architecture, it will be understood that the present approaches may be implemented at any number of devices involved with network QoS and related network connectivity operations. For instance, the present approaches may implement QoS for specific edge or cloud computing scenarios.

Figure 15:
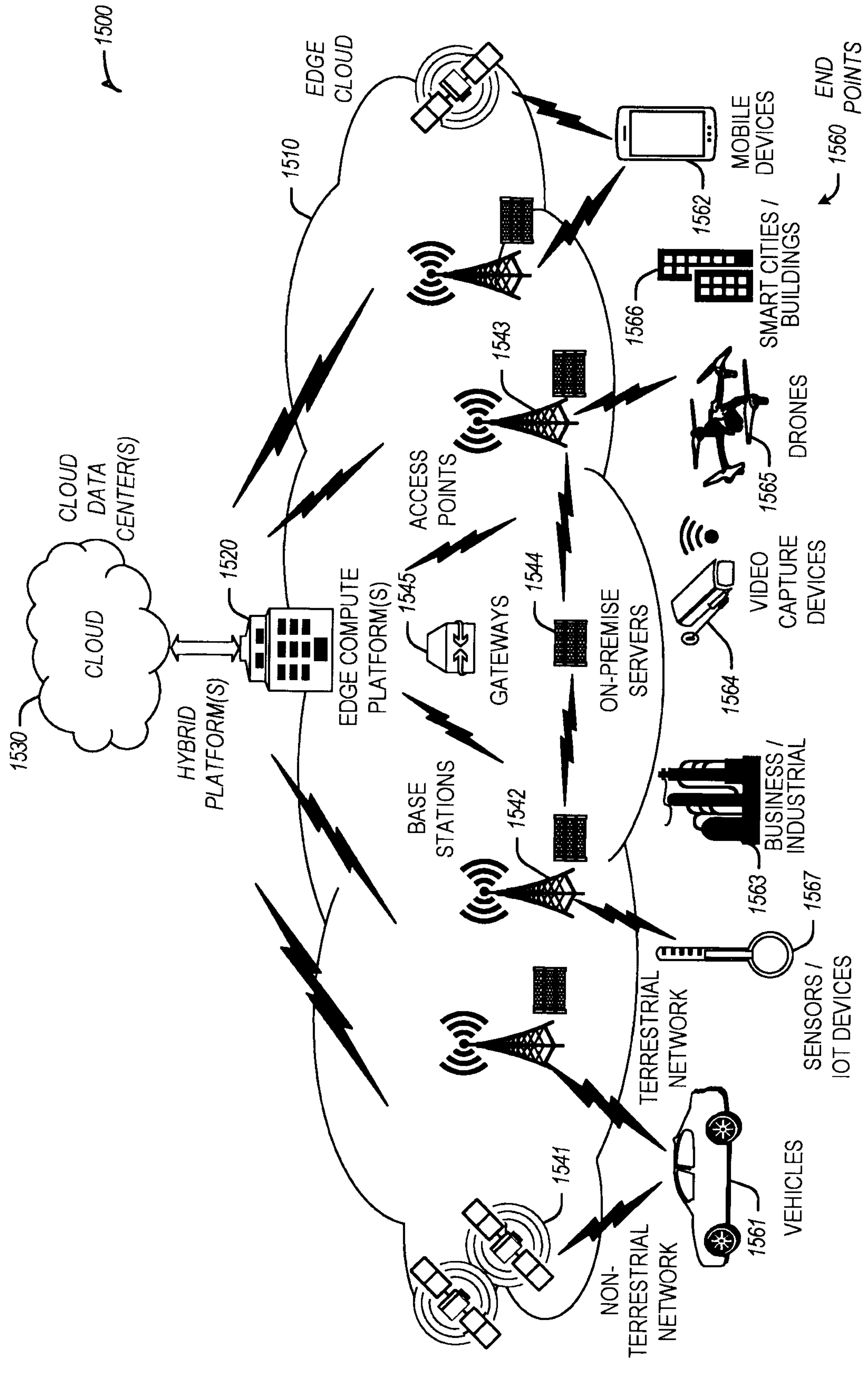
FIG. 15 illustrates an overview of an edge cloud configuration for edge computing, according to an example.

FIG. 15 is a block diagram 1500 showing an overview of a configuration for edge computing, which includes a layer of processing referenced in many of the current examples as an "edge cloud". This network topology, which may include a number of conventional networking layers (including those not shown herein), may be extended through use of other network communication and compute arrangements.

As shown, the edge cloud 1510 is established from processing operations among one or more edge locations, such as a satellite vehicle 1541, a base station 1542, a network access point 1543, an on premise server 1544, a network gateway 1545, a central office 1520, or similar networked devices and equipment instances. The edge cloud 1510 is located much closer to the endpoint (consumer and producer) data sources 1560 (e.g., autonomous vehicles 1561, user equipment 1562, business and industrial equipment 1563, video capture devices 1564, drones 1565, smart cities and building devices 1566, sensors and IoT devices 1567, etc.) than the cloud data center 1530.

The edge cloud 1510 is generally defined as involving compute that is located closer to endpoints 1560 (e.g., consumer and producer data sources) than the cloud 1530, such as compute deployed closer to autonomous vehicles 1561, user equipment 1562, business and industrial equipment 1563, video capture devices 1564, drones 1565, smart cities and building devices 1566, sensors and IoT devices 1567, etc. Compute, memory, network, and storage resources that are offered at the entities in the edge cloud 1510 can provide ultra-low or improved latency response times for services and functions used by the endpoint data sources as well as reduce network backhaul traffic from the edge cloud 1510 toward cloud 1530 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

In an example, an edge cloud architecture extends beyond typical deployment limitations to address restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services which the compute resource may be "moved" to the data, as well as scenarios in which the data may be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 15, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges. The extension of AI processing capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment. For example, such a deployment may include local ultra-low-latency processing, regional storage and processing as well as remote cloud datacenter-based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud datacenter.

Figure 16:
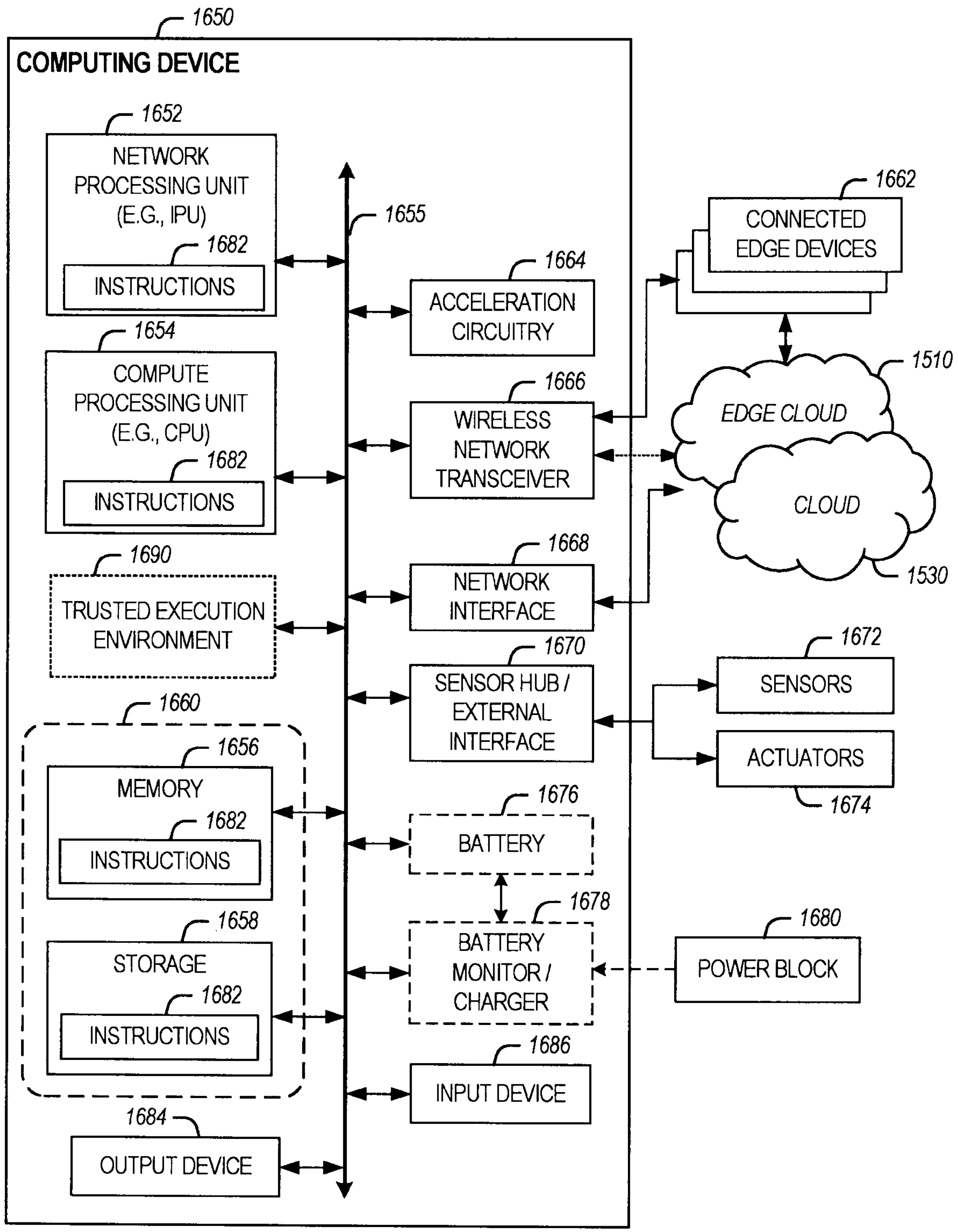
FIG. 16 illustrates a block diagram of example components in a computing device that can operate as a compute processing platform, according to an example.

FIG. 16 depicts a block diagram of example components in a computing device 1650 that can operate as a compute processing platform. The computing device 1650 may include any combinations of the components referenced above, implemented as integrated circuits (ICs), as a package or system-on-chip (SoC), or as portions thereof, discrete electronic devices, or other modules, logic, instruction sets, programmable logic or algorithms, hardware, hardware accelerators, software, firmware, or a combination thereof adapted in the computing device 1650, or as components otherwise incorporated within a larger system. Specifically, the computing device 1650 may include processing circuitry comprising one or both of a network processing unit 1652 (e.g., an infrastructure processing unit (IPU) or data processing unit (DPU)) and a compute processing unit 1654 (e.g., a CPU).

The network processing unit 1652 may provide a networked specialized processing unit such as an IPU, DPU, network processor, or other "xPU" outside of the central processing unit (CPU). The processing unit may be embodied as a standalone circuit or circuit package, integrated within an SoC, integrated with networking circuitry (e.g., in a SmartNIC), or integrated with acceleration circuitry, storage devices, or AI or specialized hardware, consistent with the examples above.

The compute processing unit 1654 may provide a processor as a central processing unit (CPU) microprocessor, multi-core processor, multithreaded processor, an ultra-low voltage processor, an embedded processor, or other forms of a special purpose processing unit or specialized processing unit for compute operations.

Either the network processing unit 1652 or the compute processing unit 1654 may be a part of a system on a chip (SoC) which includes components formed into a single integrated circuit or a single package. The network processing unit 1652 or the compute processing unit 1654 and accompanying circuitry may be provided in a single socket form factor, multiple socket form factor, or a variety of other formats.

The processing units 1652, 1654 may communicate with a system memory 1656 (e.g., random access memory (RAM)) over an interconnect 1655 (e.g., a bus). In an example, the system memory 1656 may be embodied as volatile (e.g., dynamic random access memory (DRAM), etc.) memory. Any number of memory devices may be used to provide for a given amount of system memory. A storage 1658 may also couple to the processor 1652 via the interconnect 1655 to provide for persistent storage of information such as data, applications, operating systems, and so forth. In an example, the storage 1658 may be implemented as non-volatile storage such as a solid-state disk drive (SSD). A "memory device" or "storage medium" as used herein may encompass any combination of volatile or non-volatile memory or storage—and thus, may include the system memory 1656, the storage 1658, cache on the processor 1652, among other examples.

The components may communicate over the interconnect 1655. The interconnect 1655 may include any number of technologies, including industry-standard architecture (ISA), extended ISA (EISA), peripheral component interconnect (PCI), peripheral component interconnect extended (PCIx), PCI express (PCIe), Compute Express Link (CXL), or any number of other technologies. The interconnect 1655 may couple the processing units 1652, 1654 to a transceiver 1666, for communications with connected edge devices 1662.

The transceiver 1666 may use any number of frequencies and protocols. For example, a wireless local area network (WLAN) unit may implement Wi-Fi® communications in accordance with the Institute of Electrical and Electronics Engineers (IEEE) 802.11 standard, or a wireless wide area network (WWAN) unit may implement wireless wide area communications according to a cellular, mobile network, or other wireless wide area protocol. The wireless network transceiver 1666 (or multiple transceivers) may communicate using multiple standards or radios for communications at a different range. A wireless network transceiver 1666 (e.g., a radio transceiver) may be included to communicate with devices or services in the edge cloud 1510 or the cloud 1530 via local or wide area network protocols.

The communication circuitry (e.g., transceiver 1666, network interface 1668, external interface 1670, etc.) may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, Matter®, low-power wide-area network (LPWAN) or low-power wide-area (LPWA) protocols, etc.) to effect such communication. Given the variety of types of applicable communications from the device to another component or network, applicable communications circuitry used by the device may include or be embodied by any one or more of components 1666, 1668, or 1670. Accordingly, in various examples, applicable means for communicating (e.g., receiving, transmitting, etc.) may be embodied by such communications circuitry.

The computing device 1650 may include or be coupled to acceleration circuitry 1664, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1655 may couple the processing units 1652, 1654 to a sensor hub or external interface 1670 that is used to connect additional devices or subsystems. The devices may include sensors 1672, such as accelerometers, level sensors, flow sensors, optical light sensors, camera sensors, temperature sensors, global navigation system (e.g., GPS) sensors, pressure sensors, pressure sensors, and the like. The hub or interface 1670 further may be used to connect the edge computing device 1650 to actuators 1674, such as power switches, valve actuators, an audible sound generator, a visual warning device, and the like.

In some optional examples, various input/output (I/O) devices may be present within or connected to, the edge computing device 1650. For example, a display or other output device 1684 may be included to show information, such as sensor readings or actuator position. An input device 1686, such as a touch screen or keypad may be included to accept input. An output device 1684 may include any number of forms of audio or visual display, including simple visual outputs such as LEDs or more complex outputs such as display screens (e.g., LCD screens), with the output of characters, graphics, multimedia objects, and the like being generated or produced from the operation of the edge computing device 1650.

A battery 1676 may power the edge computing device 1650, although, in examples in which the edge computing device 1650 is mounted in a fixed location, it may have a power supply coupled to an electrical grid, or the battery may be used as a backup or for temporary capabilities. A battery monitor/charger 1678 may be included in the edge computing device 1650 to track the state of charge (SoCh) of the battery 1676. The battery monitor/charger 1678 may be used to monitor other parameters of the battery 1676 to provide failure predictions, such as the state of health (SoH) and the state of function (SoF) of the battery 1676. A power block 1680, or other power supply coupled to a grid, may be coupled with the battery monitor/charger 1678 to charge the battery 1676.

In an example, the instructions 1682 on the processing units 1652, 1654 (separately, or in combination with the instructions 1682 of the machine-readable medium 1660) may configure execution or operation of a trusted execution environment (TEE) 1690. In an example, the TEE 1690 operates as a protected area accessible to the processing units 1652, 1654 for secure execution of instructions and secure access to data. Other aspects of security hardening, hardware roots-of-trust, and trusted or protected operations may be implemented in the edge computing device 1650 through the TEE 1690 and the processing units 1652, 1654.

The edge computing device 1650 may be a server, appliance computing devices, and/or any other type of computing device with the various form factors discussed above. For example, the edge computing device 1650 may be provided by an appliance computing device that is a self-contained electronic device including a housing, a chassis, a case, or a shell.

In an example, the instructions 1682 provided via the memory 1656, the storage 1658, or the processing units 1652, 1654 may be embodied as a non-transitory, machine-readable medium 1660 including code to direct the processor 1652 to perform electronic operations in the edge computing device 1650. The processing units 1652, 1654 may access the non-transitory, machine-readable medium 1660 over the interconnect 1655. For instance, the non-transitory, machine-readable medium 1660 may be embodied by devices described for the storage 1658 or may include specific storage units such as optical disks, flash drives, or any number of other hardware devices. The non-transitory, machine-readable medium 1660 may include instructions to direct the processing units 1652, 1654 to perform a specific sequence or flow of actions, for example, as described with respect to the flowchart(s) and block diagram(s) of operations and functionality discussed herein. As used herein, the terms "memory device", "storage device", "machine-readable medium", "machine-readable storage", "computer-readable storage", and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers.

In further examples, a software distribution platform (e.g., one or more servers and one or more storage devices) may be used to distribute software, such as the example instructions discussed above, to one or more devices, such as example processor platform(s) and/or example connected edge devices noted above. The example software distribution platform may be implemented by any computer server, data facility, cloud service, etc., capable of storing and transmitting software to other computing devices. In some examples, the providing entity is a developer, a seller, and/or a licensor of software, and the receiving entity may be consumers, users, retailers, OEMs, etc., that purchase and/or license the software for use and/or re-sale and/or sub-licensing.

In some examples, the instructions are stored on storage devices of the software distribution platform in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions stored in the software distribution platform are in a first format when transmitted to an example processor platform(s). In some examples, the first format is an executable binary in which particular types of the processor platform(s) can execute. However, in some examples, the first format is uncompiled code that requires one or more preparation tasks to transform the first format to a second format to enable execution on the example processor platform(s). For instance, the receiving processor platform(s) may need to compile the computer readable instructions in the first format to generate executable code in a second format that is capable of being executed on the processor platform(s). In still other examples, the first format is interpreted code that, upon reaching the processor platform(s), is interpreted by an interpreter to facilitate execution of instructions.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A computing device configured to manage Quality of Service (Qos), comprising:

processing circuitry; and a memory device including instructions embodied thereon, wherein the instructions, which when executed by the processing circuitry, configure the processing circuitry to cause operations that:

identify QoS characteristics for data flows of a user equipment (UE), the data flows performed via multiple access networks that include a 3rd Generation Partnership Project (3GPP) access network;

map the QoS characteristics to network functions of at least one of the multiple access networks;

control the network functions of the at least one of the multiple access networks, based on the QoS characteristics, wherein the network functions are implemented at respective resources located within at least one of the multiple access networks;

register a network exposure function of the 3GPP access network to a network service provided to the UE;

register the QoS characteristics to the network service;

configure the network exposure function to meet QoS requirements for the network service based on the QoS characteristics; and monitor traffic associated with the network service in the 3GPP access network and update a configuration of the network exposure function to maintain the QoS requirements based on the monitored traffic and the QoS characteristics.

2. The computing device of claim 1, wherein the multiple access networks include a non-3GPP access network, and wherein the network functions are controlled using Access Traffic Steering, Switching and Splitting (ATSSS) functionality in the 3GPP access network.

3. The computing device of claim 2, wherein the instructions further configure the processing circuitry to cause operations that:

distribute data using both of the 3GPP access network and the non-3GPP access network; and in response to a fault in one of the 3GPP access network and the non-3GPP access network or QoS requirements for at least one data flow of the data flows not being met, switch traffic from the one of the 3GPP access network and the non-3GPP access network to an other of the 3GPP access network and the non-3GPP access network, while maintaining the QoS requirements on the other of the 3GPP access network and the non-3GPP access network.

4. The computing device of claim 2, wherein the instructions further configure the processing circuitry to cause operations that:

control routing of data between the 3GPP access network and the non-3GPP access network based on radio access network measurements or a QoS tag used in a downlink flow;

negotiate QoS requirements and traffic priority in the non-3GPP access network; and adjust the routing of data between the 3GPP access network and the non-3GPP access network, based on the negotiated QoS requirements and traffic priority in the non-3GPP access network.

5. The computing device of claim 4, wherein the data is routed to the non-3GPP access network in response to an acceptance of the negotiated QoS requirements in the non-3GPP access network, and wherein the data is routed to the 3GPP access network in response to rejection of the negotiated QoS requirements in the non-3GPP access network.

6. The computing device of claim 1, wherein the instructions configure the processing circuitry to cause operations that:

control an edge processing unit associated with the computing device to meet the Qos requirements, wherein the control includes reconfiguration of a dedicated hardware packet queue of the edge processing unit based on the QoS characteristics, and wherein the edge processing unit comprises a network interface controller (NIC), smart NIC, infrastructure processing unit (IPU), or data processing unit (DPU).

7. The computing device of claim 6, wherein the dedicated hardware packet queue is an application device queue, wherein the instructions further configure the processing circuitry to cause operations that apply an ingress application data queue policy and an egress application data queue policy, and wherein the application device queue is mapped to data flows to meet the QoS requirements.

8. The computing device of claim 7, wherein the QoS requirements relate to at least one of queue size of the application device queue, dequeue rate of the application device queue, or traffic limits applied to the data flows via the application device queue.

9. The computing device of claim 6, wherein the instructions further configure the processing circuitry to cause operations that:

correlate properties of the dedicated hardware packet queue with platform resources of a network node at which the edge processing unit operates, the platform resources comprising at least one of a central processing unit resource, a cache resource, a memory resource, or an input/output resource; and determine, using one or more resource learning agents operating at least one model, recommended configurations for the dedicated hardware packet queue and the platform resources to meet the QoS requirements.

10. The computing device of claim 1, wherein the instructions further configure the processing circuitry to cause operations that:

identify, using resource learning agents, changes to a configuration of the network exposure function to maintain the QoS requirements, and wherein the resource learning agents operate at least one model to identify characteristics of the respective resources, the respective resources including at least one of: a software application, an operating system, a firmware configuration, or a hardware configuration.

11. The computing device of claim 1, wherein the instructions further configure the processing circuitry to cause operations that:

monitor real-time link status of each of the multiple access networks; and dynamically adjust a traffic splitting weight for distributing the data flows across the multiple access networks based on the monitored real-time link status, wherein the traffic splitting weight is adjusted without waiting for end-to-end measurement results.

12. The computing device of claim 1, wherein the instructions further configure the processing circuitry to cause operations that:

tag individual packets of the data flows with at least one QoS indicator prior to transmission over at least one of the multiple access networks, wherein the at least one QoS indicator comprises at least one of a Differentiated Services Code Point (DSCP) value, a 5G QoS Indicator value, or a wireless local area network (WLAN) user priority value.

13. The computing device of claim 1, wherein the instructions further configure the processing circuitry to cause operations that:

monitor bandwidth used by the network service provided to the UE; and based on the monitored bandwidth, initiate a bandwidth-based update to the configuration of the network exposure function via an application programming interface to the network exposure function, wherein the bandwidth-based update adaptively configures a fifth generation (5G) network bandwidth allocation for the network service based on the monitored bandwidth.

14. A method of managing Quality of Service (QoS), comprising:

identifying QoS characteristics for data flows of a user equipment (UE), the data flows performed via multiple access network that include a 3rd Generation Partnership Project (3GPP) access network and a non-3GPP access networks;

mapping the QoS characteristics to network functions of at least one of the multiple access networks;

controlling the network functions of the at least one of the multiple access networks using Access Traffic Steering, Switching and Splitting (ATSSS) functionality in the 3GPP access network and, based on the QoS characteristics, wherein the network functions are implemented at respective resources located within at least one of the multiple access networks;

controlling routing of data between the 3GPP access network and the non-3GPP access network based on radio access network measurements or a QoS tag used in a downlink flow;

negotiating QoS requirements and traffic priority in the non-3GPP access network; and adjusting the routing of data between the 3GPP access network and the non-3GPP access network, based on the negotiated QoS requirements and traffic priority in the non-3GPP access network.

15. The method of claim 14, further comprising:

distributing data using both of the 3GPP access network and the non-3GPP access network; and in response to a fault in one of the 3GPP access network and the non-3GPP access network or QoS requirements for at least one data flow of the data flows not being met, switching traffic from the one of the 3GPP access network and the non-3GPP access network to an other of the 3GPP access network and the non-3GPP access network, while maintaining the QoS requirements on the other of the 3GPP access network and the non-3GPP access network.

16. The method of claim 14, wherein the data is routed to the non-3GPP access network in response to an acceptance of the negotiated QoS requirements in the non-3GPP access network, and wherein the data is routed to the 3GPP access network in response to rejection of the negotiated QoS requirements in the non-3GPP access network.

17. The method of claim 14, wherein the method further comprises:

registering a network exposure function of the 3GPP access network to a network service provided to the UE;

registering the QoS characteristics to the network service;

configuring the network exposure function to meet QoS service requirements for the network service based on the QoS characteristics; and monitoring traffic associated with the network service in the 3GPP access network and updating a configuration of the network exposure function to maintain the QoS service requirements based on the monitored traffic and the QoS characteristics.

18. The method of claim 17, wherein the method further comprises identifying, using resource learning agents, changes to a configuration of the network exposure function to maintain the QoS service requirements, and wherein the resource learning agents operate at least one model to identify characteristics of the respective resources, the respective resources including at least one of: a software application, an operating system, a firmware configuration, or a hardware configuration.

19. The method of claim 14, further comprising:

controlling an edge processing unit to meet the QoS requirements, wherein the control includes reconfiguration of a dedicated hardware packet queue of the edge processing unit based on the QoS characteristics, and wherein the edge processing unit comprises a network interface controller (NIC), smart NIC, infrastructure processing unit (IPU), or data processing unit (DPU).

20. The method of claim 19, wherein the dedicated hardware packet queue is an application device queue, wherein the method further comprises applying an ingress application data queue policy and an egress application data queue policy, and wherein the application device queue is mapped to data flows to meet the QoS requirements.

21. The method of claim 20, wherein the QoS requirements relate to at least one of queue size, dequeue rate, or traffic limits.

* * * * *